(12) United States Patent
Chen et al.

(10) Patent No.: US 8,248,912 B2
(45) Date of Patent: Aug. 21, 2012

(54) SHARED CHANNEL STRUCTURE, ARQ SYSTEMS AND METHODS

(75) Inventors: Xixian Chen, Nepean (CA); Neil N. McGowan, Stittsville (CA); Muhammad Khaledul Islam, Nepean (CA); Ning Guo, Nepean (CA); Hong Ren, Kanata (CA); Litong Li, Santa Barbara, CA (US)

(73) Assignee: Alcatel Lucent, Paris (FR)

( * ) Notice: Subject to any disclaimer, the term of this patent is extended or adjusted under 35 U.S.C. 154(b) by 1528 days.

(21) Appl. No.: 11/414,269

(22) Filed: May 1, 2006

(65) Prior Publication Data
US 2006/0209674 A1 Sep. 21, 2006

Related U.S. Application Data

(62) Division of application No. 09/983,365, filed on Oct. 24, 2001, now Pat. No. 7,154,846.

(60) Provisional application No. 60/243,013, filed on Oct. 24, 2000, provisional application No. 60/246,889, filed on Nov. 8, 2000, provisional application No. 60/250,734, filed on Dec. 1, 2000, provisional application No. 60/266,602, filed on Feb. 5, 2001, provisional application No. 60/277,951, filed on Mar. 23, 2001.

(51) Int. Cl.
*H04J 11/00* (2006.01)

(52) U.S. Cl. ......... 370/209; 370/329; 370/341; 370/348

(58) Field of Classification Search ................. 375/130, 375/140, 147, 150, 146, 141, 260, 265, 262; 370/209, 320, 322, 329, 335, 341, 342, 347, 370/318, 348; 714/708; 455/67.11
See application file for complete search history.

(56) References Cited

U.S. PATENT DOCUMENTS

| | | | |
|---|---|---|---|
| 4,052,565 A | 10/1977 | Baxter | |
| 5,327,576 A | 7/1994 | Uddenfeldt et al. | |
| 5,638,412 A | 6/1997 | Blakeney, II et al. | |
| 5,711,005 A * | 1/1998 | Farrag | 455/441 |
| 5,751,761 A * | 5/1998 | Gilhousen | 375/146 |
| 5,832,368 A | 11/1998 | Nakano et al. | |
| 5,946,356 A | 8/1999 | Felix et al. | 375/295 |
| 6,064,663 A | 5/2000 | Honkasalo et al. | |

(Continued)

FOREIGN PATENT DOCUMENTS
EP     0841763 B1    12/2003

(Continued)

OTHER PUBLICATIONS

3GPP RAN TSG/WG2 Incorporation of ETSI shared channel concepts in 3GPP documenation (Jan. 20-22, 1999).

(Continued)

*Primary Examiner* — Brian D Nguyen
*Assistant Examiner* — Toan D Nguyen
(74) *Attorney, Agent, or Firm* — Fay Sharpe LLP

(57) ABSTRACT

A forward link design is provided employing CDMA (code division multiple access) technologies in which time division multiplexing is employed between data and control information on the forward link to service multiple users per slot. Another forward link design employing CDMA (code division multiple access) technologies is provided in which code division multiplexing between data and control information is employed on the forward link to service multiple users per slot, which is preferably backwards compatible with legacy standards such as IS2000A. A reverse link design is also provided.

26 Claims, 32 Drawing Sheets

U.S. PATENT DOCUMENTS

| | | | |
|---|---|---|---|
| 6,088,337 A * | 7/2000 | Eastmond et al. | 370/280 |
| 6,128,504 A * | 10/2000 | Ciccone | 455/464 |
| 6,147,964 A * | 11/2000 | Black et al. | 370/209 |
| 6,198,719 B1 * | 3/2001 | Faruque et al. | 370/209 |
| 6,275,478 B1 | 8/2001 | Tiedemann, Jr. | |
| 6,275,711 B1 * | 8/2001 | Yamada et al. | 455/522 |
| 6,317,413 B1 * | 11/2001 | Honkasalo | 370/209 |
| 6,366,778 B1 * | 4/2002 | Bender et al. | 455/442 |
| 6,400,928 B1 * | 6/2002 | Khullar et al. | 455/67.11 |
| 6,407,993 B1 * | 6/2002 | Moulsley | 370/347 |
| 6,490,257 B1 * | 12/2002 | Watanabe et al. | 370/318 |
| 6,510,148 B1 | 1/2003 | Honkasalo | |
| 6,519,456 B2 | 2/2003 | Antonio et al. | |
| 6,542,487 B1 * | 4/2003 | Ishii et al. | 370/335 |
| 6,574,211 B2 | 6/2003 | Padovani et al. | |
| 6,578,162 B1 * | 6/2003 | Yung | 714/708 |
| 6,631,123 B1 | 10/2003 | Jiang et al. | |
| 6,633,552 B1 * | 10/2003 | Ling et al. | 370/318 |
| 6,711,144 B1 | 3/2004 | Kim et al. | |
| 6,731,618 B1 * | 5/2004 | Chung et al. | 370/328 |
| 6,747,994 B2 | 6/2004 | Oses et al. | |
| 6,765,896 B1 * | 7/2004 | Ahmed et al. | 370/338 |
| 6,823,193 B1 | 11/2004 | Persson et al. | |
| 6,831,910 B1 | 12/2004 | Moon et al. | |
| 6,879,581 B1 * | 4/2005 | Leung | 370/352 |
| 6,888,805 B2 * | 5/2005 | Bender et al. | 370/314 |
| 6,907,020 B2 * | 6/2005 | Periyalwar et al. | 370/337 |
| 7,006,428 B2 * | 2/2006 | Proctor et al. | 370/208 |
| 7,088,701 B1 * | 8/2006 | Attar et al. | 370/347 |
| 2003/0123413 A1 | 7/2003 | Moon et al. | |
| 2003/0123414 A1 * | 7/2003 | Tong et al. | 370/337 |

FOREIGN PATENT DOCUMENTS

| | | |
|---|---|---|
| EP | 0538546 B1 | 6/2004 |
| GB | 2318705 A | 4/1998 |
| WO | WO 96/10320 A2 | 4/1996 |
| WO | 9923844 | 5/1999 |
| WO | WO 00/13446 A1 | 3/2000 |
| WO | 0186837 | 11/2001 |

OTHER PUBLICATIONS

3G TS 25.211 v3.2.0 (Mar. 2000) $3^{rd}$ Generation Partnership Project: Technical Specification Group Radio Access Network; Physical channels and mapping of transport channels onto physical channels (FDD) (Release 1999).

ETSI TS 125 303 V3.3.0 (Mar. 2000); Universal Mobile Telecommunications System (UMTS); Interlayer Procedures in Connected Mode (3G TS 25.303 version 3.3.0 Release 1999).

* cited by examiner

FL PHYSICAL LAYER PARAMETERS (DATA)

| Data Rate (kbps) | Slots | Bits | Code Rate | Modulation | Number of Values per Physical Layer Packet ||||||||
|---|---|---|---|---|---|---|---|---|---|---|---|
| | | | | | Modu. Symbols Provided | Repetition Factor | Approx Coding Rate | Preamble Chips | Pilot Chips | MAC Chips | Data Chips |
| 38.4 | 16 | 768 | 1/5 | QPSK | 1,920 | 9.6 | 1/5 | 1,024 | 3,072 | 2,048 | 18,432 |
| 76.8 | 8 | 768 | 1/5 | QPSK | 1,920 | 4.8 | 1/5 | 512 | 1,536 | 1,024 | 9,216 |
| 153.6 | 4 | 768 | 1/5 | QPSK | 1,920 | 2.4 | 1/5 | 256 | 768 | 512 | 4,608 |
| 307.2 | 2 | 768 | 1/5 | QPSK | 1,920 | 1.2 | 1/5 | 128 | 384 | 256 | 2,304 |
| 614.4 | 1 | 768 | 1/3 | QPSK | 1,152 | 1 | 1/5 | 64 w EDRI | 192 | 128 | 1,152 |
| 614.4 | 2 | 1536 | 1/3 | QPSK | 2,304 | 1 | 1/3 | 2x64 w EDRI | 384 | 256 | 2,304 |
| 1,228.8 | 1 | 1536 | 1/3 | QPSK | 2,304 | 1 | 2/3 | 64 w EDRI | 192 | 128 | 1,152 |
| 921.6 | 2 | 2304 | 1/3 | 8-PSK | 2,304 | 1 | 1/3 | 2x64 w EDRI | 384 | 256 | 2,304 |
| 1,843.2 | 1 | 2304 | 1/3 | 8-PSK | 1,152 | 1 | 2/3 | 64 w EDRI | 192 | 128 | 1,152 |
| 1,228.8 | 2 | 3072 | 1/3 | 16-QAM | 2,304 | 1 | 1/3 | 2x64 w EDRI | 384 | 256 | 2,304 |
| 2,457.6 | 1 | 3072 | 1/3 | 16-QAM | 2,304 | 1 | 2/3 | 64 w EDRI | 192 | 128 | 1,152 |

FIG. 5A

FL PHYSICAL LAYER PARAMETERS FOR VOICE (1)

| Vocoder | Rate | Bits | Code Rate | Modulation | Number of Values per Physical Layer Packet | | | | | |
|---|---|---|---|---|---|---|---|---|---|---|
| | | | | | Modulation Symbols Needed | Approx Coding Rate | Preamble Chips | Pilot Chips | MAC Chips | Data Chips |
| 8k | Full | 184 | 1/3 | 16-QAM | 72 | 0.64 | 64 | 192 | 128 | 1,152 |
| | 1/2 | 88 | 1/3 | QPSK | 72 | 0.61 | 64 | 192 | 128 | 1,152 |
| | 1/4 | 46 | 1/3 | QPSK | 72 | 0.32 | 64 | 192 | 128 | 1,152 |
| | 1/8 | 22 | 1/3 | QPSK | 72 | 0.15 | 64 | 192 | 128 | 1,152 |
| 13k | Full | 279 | 1/3 | 16-QAM | 72 | 0.97 | 64 | 192 | 128 | 1,152 |
| | 1/2 | 135 | 1/3 | 16-QAM | 72 | 0.47 | 64 | 192 | 128 | 1,152 |
| | 1/4 | 63 | 1/3 | QPSK | 72 | 0.44 | 64 | 192 | 128 | 1,152 |
| | 1/8 | 27 | 1/3 | QPSK | 72 | 0.19 | 64 | 192 | 128 | 1,152 |

FIG. 5B

FL PHYSICAL LAYER PARAMETERS FOR VOICE (2)

| Vocoder | Rate | Bits | Code Rate | Modulation | Modulation Symbols Needed | Coding Rate | Preamble Chips | Pilot Chips | MAC Chips | Data Chips |
|---|---|---|---|---|---|---|---|---|---|---|
| | | | | | Number of Values per Physical Layer Packet | | | | | |
| 8k | full | 184 | 1/3 | QPSK | 136 | 0.68 | 128 | 192 | 128 | 1,088 |
| | 1/2 | 88 | 1/3 | QPSK | 136 | 0.32 | 128 | 192 | 128 | 1,088 |
| | 1/4 | 46 | 1/3 | QPSK | 136 | 0.17 | 128 | 192 | 128 | 1,088 |
| | 1/8 | 22 | 1/3 | QPSK | 136 | 0.08 | 128 | 192 | 128 | 1,088 |
| 13k | Full | 279 | 1/3 | 16-QAM | 136 | 0.51 | 128 | 192 | 128 | 1,088 |
| | 1/2 | 135 | 1/3 | QPSK | 136 | 0.5 | 128 | 192 | 128 | 1,088 |
| | 1/4 | 63 | 1/3 | QPSK | 136 | 0.23 | 128 | 192 | 128 | 1,088 |
| | 1/8 | 27 | 1/3 | QPSK | 136 | 0.1 | 128 | 192 | 128 | 1,088 |

FIG. 5C

FL PHYSICAL LAYER PARAMETERS FOR VOICE (3)

| Vocoder | Rate | Bits | Code Rate | Modulation | Number of Values per Physical Layer Packet ||||||
|---|---|---|---|---|---|---|---|---|---|---|
| | | | | | Modulation Symbols Needed | Coding Rate | Preamble Chips | Pilot Chips | MAC Chips | Data Chips |
| 8k | Full | 184 | 1/3 | QPSK | 240 | 0.38 | 256 | 192 | 128 | 960 |
| | 1/2 | 88 | 1/3 | QPSK | 240 | 0.18 | 256 | 192 | 128 | 960 |
| | 1/4 | 46 | 1/3 | QPSK | 240 | 0.10 | 256 | 192 | 128 | 960 |
| | 1/8 | 22 | 1/3 | QPSK | 240 | 0.05 | 256 | 192 | 128 | 960 |
| 13k | Full | 279 | 1/3 | QPSK | 240 | 0.58 | 256 | 192 | 128 | 960 |
| | 1/2 | 135 | 1/3 | QPSK | 240 | 0.28 | 256 | 192 | 128 | 960 |
| | 1/4 | 63 | 1/3 | QPSK | 240 | 0.13 | 256 | 192 | 128 | 960 |
| | 1/8 | 27 | 1/3 | QPSK | 240 | 0.06 | 256 | 192 | 128 | 960 |

FIG. 5D

FORWARD LINK SLOT STRUCTURE

| CHANNEL | WALSH CODES | |
|---|---|---|
| IS-95 F-PICH | $W_0^{64}$ | $W_0^{16}$ |
| IS-95 F-SYNC | $W_{32}^{64}$ | |
| IS-2000 F-TDPICH | $W_{16}^{128}$ | |
| IS-2000 F-QPCH 1 | $W_{80}^{128}$ | |
| IS-2000 F-QPCH 2 | $W_{48}^{128}$ | |
| F-SPCH INSTEAD OF IS-2000 F-QPCH3 | $W_{112}^{128}$ | |
| IS-95 F-PCH | $W_1^{64}$ | $W_1^{16}$ |
| F-UICH (64 USERS) | $W_{33}^{512}, W_{289}^{512}, W_{161}^{512}, W_{317}^{512},$ $W_{97}^{512}, W_{353}^{512}, W_{225}^{512}, W_{481}^{512}$ | |
| F-SHPCCH (70 USERS) PLUS IFLEX-DV F-RA CHANNEL | $W_{17}^{128}, W_{81}^{128}, W_{49}^{128}$ | |
| F-CEDRICH | $W_{113}^{512}, W_{369}^{512}, W_{241}^{512}, W_{497}^{512},$ | |
| F-SHCH | $W_2^{16}, W_3^{16}, \quad W_{15}^{16}$ | |

FIG. 9

FORWARD LINK SHCH VOICE PARAMETERS

| CODE TYPE | # $W^{16}$ USED | RATE | BITS | CODE RATE | MODULATION | MODULATION ON SYMBOLS NEEDED | MODULATION ON SYMBOLS PROVIDED | APPROX. CODING RATE |
|---|---|---|---|---|---|---|---|---|
| TURBO | 1 | FULL | 192 | 1/5 | 8-PSK | 96 | 320 | 0.67 |
| CONV | 1 | 1/2 | 96 | 1/4 | QPSK | 96 | 192 | 0.50 |
| CONV | 1 | 1/4 | 54 | 1/4 | QPSK | 96 | 108 | 0.28 |
| CONV | 1 | 1/8 | 30 | 1/4 | QPSK | 96 | 60 | 0.16 |
| TURBO | 2 | FULL | 192 | 1/5 | QPSK | 192 | 480 | 0.50 |

FIG. 12

FORWARD LINK SHCH DATA PARAMETERS (1)

| Data Rate (kbps) | Packet Size | No. of Walsh Codes | No. of Slots | Code Rate | Modulation Order | Mod Symbols Needed | Mod Symbols Provided | Effective Code Rate |
|---|---|---|---|---|---|---|---|---|
| 4915.2 | 6144 | 14 | 1 | 0.2 | 6 | 1344 | 5120 | 0.761905 |
| 2457.6 | 3072 | 14 | 1 | 0.2 | 4 | 1344 | 3840 | 0.571429 |
| 1228.8 | 1536 | 14 | 1 | 0.2 | 3 | 1344 | 2560 | 0.380952 |
| 614.4 | 768 | 14 | 1 | 0.2 | 2 | 1344 | 1920 | 0.285714 |
| 2457.6 | 3072 | 10 | 1 | 0.2 | 6 | 960 | 2560 | 0.533333 |
| 1228.8 | 1536 | 10 | 1 | 0.2 | 4 | 960 | 1920 | 0.4 |
| 614.4 | 768 | 10 | 1 | 0.2 | 2 | 960 | 1920 | 0.4 |
| 307.2 | 384 | 10 | 1 | 0.2 | 2 | 960 | 960 | 0.2 |
| 2457.6 | 3072 | 7 | 1 | 0.2 | 6 | 672 | 2560 | 0.761905 |
| 1228.8 | 1536 | 7 | 1 | 0.2 | 4 | 672 | 1920 | 0.571429 |
| 614.4 | 768 | 7 | 1 | 0.2 | 2 | 672 | 1920 | 0.571429 |
| 307.2 | 384 | 7 | 1 | 0.2 | 2 | 672 | 960 | 0.285714 |
| 1228.8 | 1536 | 4 | 1 | 0.2 | 6 | 384 | 1280 | 0.666667 |
| 614.4 | 768 | 4 | 1 | 0.2 | 4 | 384 | 960 | 0.5 |
| 307.2 | 384 | 4 | 1 | 0.2 | 2 | 384 | 960 | 0.5 |
| 614.4 | 768 | 3 | 1 | 0.2 | 4 | 288 | 960 | 0.666667 |
| 307.2 | 384 | 3 | 1 | 0.2 | 2 | 288 | 960 | 0.666667 |
| 614.4 | 768 | 2 | 1 | 0.2 | 6 | 192 | 960 | 0.666667 |
| 307.2 | 384 | 2 | 1 | 0.2 | 3 | 192 | 640 | 0.666667 |
| 153.6 | 192 | 2 | 1 | 0.2 | 2 | 192 | 480 | 0.5 |
| 153.6 | 192 | 1 | 1 | 0.2 | 3 | 96 | 320 | 0.666667 |

FIG. 13

FORWARD LINK SHCH DATA PARAMETERS (2)

| Data Rate (kbps) | Packet Size | No. of Walsh Codes | No. of Slots | Code Rate | Modulation Order | Mod Symbols Needed | Mod Symbols Provided | Effective Code Rate |
|---|---|---|---|---|---|---|---|---|
| 1228.8 | 3072 | 14 | 2 | 0.2 | 3 | 2688 | 5120 | 0.380952 |
| 614.4 | 1536 | 14 | 2 | 0.2 | 3 | 2688 | 2560 | 0.190476 |
| 307.2 | 768 | 14 | 2 | 0.2 | 2 | 2688 | 1920 | 0.142857 |
| 153.6 | 384 | 14 | 2 | 0.2 | 2 | 2688 | 960 | 0.071429 |
| 614.4 | 3072 | 14 | 4 | 0.2 | 2 | 5376 | 7680 | 0.285714 |
| 307.2 | 1536 | 14 | 4 | 0.2 | 2 | 5376 | 3840 | 0.142857 |
| 153.6 | 768 | 14 | 4 | 0.2 | 2 | 5376 | 1920 | 0.071429 |
| 76.8 | 384 | 14 | 4 | 0.2 | 2 | 5376 | 960 | 0.035714 |
| 1228.8 | 3072 | 10 | 2 | 0.2 | 4 | 1920 | 3840 | 0.4 |
| 614.4 | 1536 | 10 | 2 | 0.2 | 3 | 1920 | 2560 | 0.266667 |
| 307.2 | 768 | 10 | 2 | 0.2 | 2 | 1920 | 1920 | 0.2 |
| 153.6 | 384 | 10 | 2 | 0.2 | 2 | 1920 | 960 | 0.1 |
| 614.4 | 3072 | 10 | 4 | 0.2 | 2 | 3840 | 7680 | 0.4 |
| 307.2 | 1536 | 10 | 4 | 0.2 | 2 | 3840 | 3840 | 0.2 |
| 153.6 | 768 | 10 | 4 | 0.2 | 2 | 3840 | 1920 | 0.1 |
| 76.8 | 384 | 10 | 4 | 0.2 | 2 | 3840 | 960 | 0.05 |
| 307.2 | 768 | 1 | 2 | 0.2 | 6 | 192 | 640 | 0.666667 |
| 153.6 | 384 | 1 | 2 | 0.2 | 3 | 192 | 640 | 0.666667 |
| 76.8 | 192 | 1 | 2 | 0.2 | 2 | 192 | 480 | 0.5 |
| 307.2 | 1536 | 1 | 4 | 0.2 | 6 | 384 | 1280 | 0.666667 |
| 153.6 | 768 | 1 | 4 | 0.2 | 3 | 384 | 1280 | 0.666667 |
| 76.8 | 384 | 1 | 4 | 0.2 | 2 | 384 | 960 | 0.5 |
| 38.4 | 192 | 1 | 4 | 0.2 | 2 | 384 | 480 | 0.25 |

FIG. 14

REVERSE SCH CODING AND MODULATION PARAMETERS 1

| Reverse Rate Index | 1 (DCCH) | 2 | 3 | 4 | 5 | 6 | 7 |
|---|---|---|---|---|---|---|---|
| Data Rate (kbps) | 9.6 | 4.8 | 9.6 | 19.2 | 38.4 | 76.8 | 153.6 |
| Encoder Packet Size (bits) | 184 | 88 | 184 | 376 | 760 | 1528 | 3064 |
| Code Rate (bit/sym) | 0.25 | 0.25 | 0.25 | 0.25 | 0.25 | 0.25 | 0.25 |
| Code Symbols/Packet | 1536 | 1536 | 1536 | 1536 | 3072 | 6144 | 12288 |
| Code Symbol Rate (kbps) | 76.8 | 76.8 | 76.8 | 76.8 | 153.6 | 307.2 | 614.4 |
| Interleaved Packet Repeats | 2 | 4 | 2 | 1 | 1 | 1 | 1 |
| Data Modulation | BPSK | BPSK | BPSK | BPSK | BPSK | BPSK | BPSK |
| PN Chips per Encoder bit | 128 | 256 | 128 | 64 | 32 | 16 | 8 |

FIG. 22

REVERSE SCH CODING AND MODULATION PARAMETERS 2

| Reverse Rate Index | 1 (DCCH) | 2 | 3 | 4 | 5 | 6 | 7 |
|---|---|---|---|---|---|---|---|
| Data Rate (kbps) | 9.6 | 4.8 | 38.4 | 76.8 | 153.6 | 307.2 | 614.4 |
| Encoder Packet Size (bits) | 184 | 88 | 760 | 1528 | 3064 | 6136 | 12272 |
| Code Rate (bit/sym) | 0.25 | 0.25 | 0.25 | 0.25 | 0.25 | 0.5 | 1 |
| Code Symbols/Packet | 1536 | 1536 | 3072 | 6144 | 12288 | 12288 | 12288 |
| Code Symbol Rate (kbps) | 76.8 | 76.8 | 153.6 | 307.2 | 614.4 | 614.4 | 614.4 |
| Interleaved Packet Repeats | 2 | 4 | 1 | 1 | 1 | 1 | 1 |
| Data Modulation | BPSK | BPSK | BPSK | BPSK | BPSK | BPSK | BPSK |
| PN Chips per Encoder bit | 128 | 256 | 32 | 16 | 8 | 4 | 2 |

FIG. 23

SHARED CHANNEL STRUCTURE, ARQ SYSTEMS AND METHODS

RELATED APPLICATIONS

This application is a divisional of 09/983,365 filed Oct. 24, 2001 now U.S. Pat. No. 7,154,846.

This application claims the benefit of provisional application 60/243,013 filed Oct. 24, 2000, provisional application 60/246,889 filed Nov. 8, 2000, 60/250,734 filed Dec. 1, 2000, provisional application 60/266,602 filed Feb. 5, 2001, and provisional application 60/277,951 filed Mar. 23, 2001.

FIELD OF THE INVENTION

This invention relates to CDMA systems which provide both data and voice functionality.

BACKGROUND OF THE INVENTION

Code Division Multiple Access (CDMA) is a cellular technology originally standardized as IS-95, which competes with GSM technology for dominance in the cellular world. CDMA employs spread-spectrum technology which increases the capacity of cellular systems. CDMA was adopted by the Telecommunications Industry Association (TIA) in 1993. Different variations now exist, with the original CDMA now known as cdmaOne. For example, there is now cdma2000 1xRTT and its variants like 1xEV-DO and 1xEV-DV and 3xRTT Multi-Carrier (MC 3x). These basically refer to variants of usage of a 1.25 MHz carrier channel. For example, MC 3x uses a 3.75 MHz carrier channel. By May 2001, there were 35 million subscribers on cdmaOne systems worldwide.

Third Generation efforts under ITU's IMT-2000 initiative have been motivated in large part by a need to increase the supported data rates over wireless channels. The demand for high rates has not been met by second generation systems since these systems have been defined and designed for only voice and low-rate data. Higher data rates require more bandwidth on the radio channel for transmission.

The cdma2000 standard is a 3rd Generation (3G) solution based on the original IS-95 standard. Unlike some other 3G standards, cdma2000 is an evolution of an existing wireless standard. The cdma2000 standard supports 3G services as defined by the International Telecommunications Union (ITU) for IMT-2000. 3G networks will deliver wireless services with better performance, greater cost-effectiveness and significantly more content. Essentially, the goal is access to any service, anywhere, anytime from one wireless terminal i.e. true converged, mobile services.

Worldwide resources are currently being devoted to roll out third-generation CDMA technology. The cdma2000 standard is one mode of the radio access "family" of air interfaces agreed upon by the Operators Harmonization Group for promoting and facilitating convergence of third generation (3G) networks. In other words, the cdma2000 standard is one solution for wireless operators who want to take advantage of new market dynamics created by mobility and the Internet. The cdma2000 standard is both an air interface and a core network solution for delivering the services that customers are demanding today.

The goal of the cdma2000 standard was to mitigate risks, protect investments and deliver significant performance boosts to operators as they evolve their networks to offer 3G services. Networks based on cdma2000 are backward compatible to cdmaOne (IS-95) deployments, protecting operator investments in cdmaOne networks and providing simple and cost-effective migration paths to the next generation. In addition, cdma2000 networks offer voice quality and voice capacity improvements, and support for high speed and multimedia data services.

The first phase of cdma2000—variously known as 1xRTT, 3G1X, or just plain 1X—offers approximately twice the voice capacity of cdmaOne, average data rates of 144 kbps, backward compatibility with cdmaOne networks, and many other performance improvements. The cdma2000 1xRTT standard can be implemented in existing spectrum or in new spectrum allocations. A cdma2000 1xRTT network will also introduce simultaneous voice and data services, low latency data support and other performance improvements. The backward compatibility with cdmaOne provided by cdma2000 further ensures investment protection.

However, the cdma2000 standard is evolving to continually support new services in a standard 1.25 MHz carrier. In this regard, the evolution of CDMA2000 beyond 1xRTT is now termed CDMA2000 1xEV or 1xEV for short. 1xEV is further divided into two stages: 1xEV-DO and 1xEV-DV. 1xEV-DO stands for 1X Evolution Data Only. 1xEV-DV stands for 1X Evolution Data and Voice. Both 1xEV evolution steps provide for advanced services in cdma2000 using a standard 1.25 MHz carrier. The evolution of cdma2000 will, therefore, continue to be backwards compatible with today's networks and forward compatible with each evolution option.

The 1xEV-DO standard is expected to be available for cdma2000 operators sometime during 2002, and will provide for even higher data rates on 1X systems. Specifically, 1xEV-DO specifies a separate carrier for data, and this carrier will be able to hand-off to a 1X carrier if simultaneous voice and data services are needed. By allocating a separate carrier for data, operators will be able to deliver peak data transmission rates in excess of 2 Mbps to their customers.

It is envisioned that 1xEV-DV solutions will be available approximately one and a half to two years after 1xEV-DO. A goal of 1xEV-DV is to bring data and voice services for cdma2000 back into one carrier. That is, a 1xEV-DV carrier should provide not only high speed data and voice simultaneously, but should also be capable of delivering real-time packet services.

In summary, then, the cdma2000 1xRTT standard is optimized for voice and provides basic packet data services up to 163.2 kbps. This standard is currently being commercialized and will be in the market very soon if not already. The cdma2000 1xEV-DO standard is optimized for data only and provides efficient data service up to 2 Mbps. This standard is to be deployed after cdma2000 1xRTT. Finally, a proposed cdma2000 1xEV-DV standard is to be optimized for both data and voice. Providing simultaneous voice and data services, the goal of such a standard is to provide more spectrum efficiency. Therefore, in terms of the evolution path of the cdma2000 standards for wireless high-speed data transmission, the cdma2000 1xRTT standard is currently progressing towards a cdma2000 1xEV-DO standard which is, in turn, progressing towards an optimized cdma2000 1xEV-DV standard.

In examining the migration path from the 1xRTT standard to 1xEV-DO, those skilled in the art will appreciate that High Data Rate (HDR) technology served as the base technology for 1xEV-DO. Furthermore, the incorporation of the 1xRTT reverse link in 1xEV-DO achieved the objectives of technology reuse as well as providing a cost-effective solution.

In a similar manner, a graceful evolution from 1xEV-DO to 1xEV-DV will minimize re-investments and avoid fragmenting the industry. In this light, 1xEV-DV should be backward compatible to the 1xRTT family of standards and products. In other words, customer and operator investments in CDMA systems should be protected. There should be maximum reuse whenever possible and the 1xEV-DV standard should also consider possible future evolutions such as packet voice.

In addition to the above, any 1xEV-DV proposal should meet the CDMA Development Group (CDG) and Operator's requirements. Specifically, 1xEV-DV should support services with various QoS attributes, simultaneous voice and data on the same carrier, voice capacity enhancement, more spectrum efficiency in packet data transmission and scalability to 3X mode operations.

1xEV-DO increases data capacity but does not allow for voice on the same carrier and therefore does not change the voice capacity of the cdma2000 family. Voice traffic must continue to use 1xRTT. As of Oct. 22, 2001 1xEV-DV proposals have integrated voice and data but voice is handled in the same fashion as 1xRTT thus the voice capacity is unchanged.

SUMMARY OF THE INVENTION

A first broad aspect of the invention provides a method of transmitting over a forward link in a CDMA (code division multiple access) communications system. The method involves transmitting forward link frames, each frame comprising a plurality of slots; for each slot, transmitting a forward shared channel, the forward shared channel being adapted to have up to a predetermined maximum number of Walsh covers, and the forward shared channel being scheduled slot-wise to carry in some slots content for a single high-rate data user, in some slots content for a plurality of voice users (a voice user being voice or low-rate data); and transmitting a user identification channel adapted to allow users to determine which slots contain their content.

Preferably, the forward shared channel is further adapted to have scheduled in some slots content for a plurality of voice users and a single high-rate data users.

In some embodiments, the user identification channel is transmitted in parallel with the shared channel using a different code space.

Preferably, during each slot the forward shared channel is scheduled over a number of Walsh covers equal to the predetermined maximum number of Walsh covers minus a number of Walsh covers necessary to accommodate legacy users being serviced during the slot.

The Walsh covers in some embodiments are 16-ary Walsh covers and in a given slot, one or more of the 16-ary Walsh covers is further sub-divided for the plurality of voice users, with all remaining 16-ary Walsh covers of the forward shared channel being assigned to a shared data channel which is made available to a single high-rate data user at a time.

Preferably, each slot has a 1.25 ms slot duration, with the shared data channel content for a given user may occupy multiple contiguous slots.

BRIEF DESCRIPTION OF THE DRAWINGS

The invention will now be described in further detail by way of example with reference to the attached drawings in which:

FIG. 5A is an example set of physical layer parameters for data on the forward link;

FIG. 5B is an example set of physical layer parameters for voice on the forward link for users having a high channel estimate;

FIG. 5C is an example set of physical layer parameters for voice on the forward link for users having a medium channel estimate;

FIG. 5D is an example set of physical layer parameters for voice on the forward link for users having a low channel estimate;

FIG. 9 illustrates an example set of Walsh separation codes for the forward link structures of FIGS. 7 and 8;

FIG. 12 is an example set of forward link shared channel voice parameters;

FIGS. 13 and 14 are example sets of forward link shared channel data parameters;

FIG. 22 is an example lower rate set of reverse supplementary channel coding and modulation parameters; and FIG. 23 is an example higher rate set of reverse supplementary channel coding and modulation parameters.

DETAILED DESCRIPTION OF THE PREFERRED EMBODIMENTS

Figure 1A:
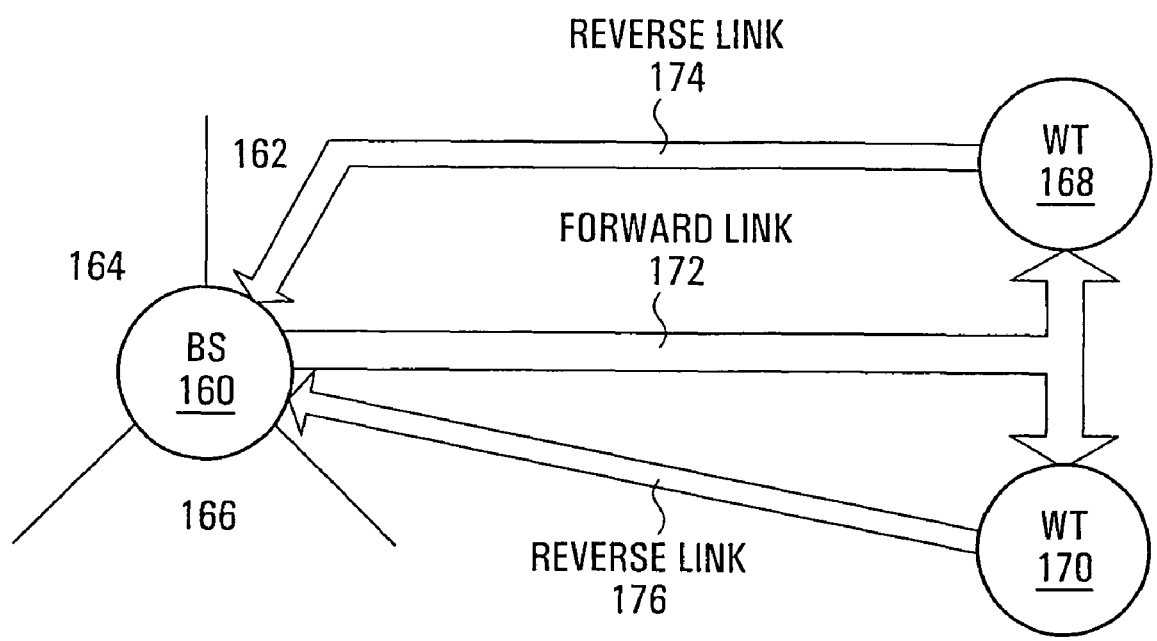
FIG. 1A is a network schematic for a first embodiment of the invention.

FIG. 1A shows a system schematic of an example wireless system in which various embodiment of the invention may be employed. A base station (BS) 160 is shown having three coverage area sectors 162,164,166. The base station 160 forms part of a larger wireless access network (not shown). Different numbers of sectors may be employed. By way of example, shown are two wireless terminals (WT) 168,170 in sector 162, although a sector may serve more than two wireless terminals. There is a shared forward link generally indicated by 172 used for transmissions from the base station 160 to wireless terminals 168,170. Each wireless terminal also has a respective dedicated reverse link 174, 176. Both the forward link 172 and the reverse links 174,176 employ CDMA fundamentals.

A first embodiment of the invention provides a forward link design employing CDMA (code division multiple access) technologies in which time division multiplexing is employed between data and control information on the forward link to service multiple users per slot. The first embodiment will be described with reference to FIGS. 1 to 5. Preferably, this design may be employed as a forward link portion of a 1XEV-DV solution. Another embodiment of the invention provides a forward link design employing CDMA (code division multiple access) technologies in which code division multiplexing between data and control information is employed on the forward link to service multiple users per slot, which is preferably backwards compatible with legacy standards such as IS2000A. This embodiment will be described below with reference to FIGS. 6 to 16. Preferably, this design may be employed as a forward link portion of a 1XEV-DV solution. Either of the forward link designs may be used in combination with a reverse link design provided by another embodiment of the invention which is preferably also suitable as an 1XEV-DV reverse link solution. The reverse link is described in detail below with reference to FIGS. 17 to 23. The reverse link design is preferably similar to that now standardized in 1xRTT for example but with some refinements. This allows for a significant reuse of existing hardware and software, while at the same time providing excellent data performance.

Preferably, for all embodiments, a 20 ms physical layer frame length is used for both the reverse link and the forward link. This is consistent with 1xRTT. Advantageously, this frame size would allow a tri-mode modem capable of supporting IS-95, IXRTT and 1XEV-DV. Also, in the discussion which follows, where the terms "voice" or "voice user" are used, this is intended to refer to any low rate users, namely users requiring the transmission of voice data per se or to users having a data rate equivalent to the data rate required for voice information, i.e. data users requiring a relatively low data rate.

An objective of wireless access network Radio Link Protocol (RLP) ARQ schemes is to provide improved radio link quality by implementing a retransmission mechanism for all the services and applications. These embodiments of the invention provides a new ARQ mechanism for voice services in packet wireless communication systems.

There are two types of the services which may be provided. One type of service provides for delay-sensitive services, such as voice service. The other type of service provides for non-delay-sensitive service, such as data services.

For the voice services, as will be detailed below, a base station may send signals to multiple wireless terminals in one slot, each wireless terminal receiving a packet during the slot. In response to this, multiple wireless terminals will send an ARQ signal back to the base station to indicate if they received the packets correctly or not. For high-rate data services, a single user will receive data during a given slot. Two methods of achieving this are provided.

Forward Link—Time Division Multiplexed Control Implementation

Details of a first implementation of forward link 172 of FIG. 1 will now be provided with reference to FIGS. 1 to 5. The new forward link design allows for the efficient use of resources through the use of multiple-user forward link slots. The forward link employs a preamble that allows multi-user packets on the forward link. This results in efficient allocation of forward link slots for voice and data service for multiple users.

The forward link is time multiplexed, with 20 ms frames consisting of 16 slots with 1.25 ms per slot. Each slot contains 1536 chips. Transmission starts from one of the 16 slot boundaries. As will be described in detail below, each slot will support multiple users.

The forward link time-multiplexes a forward pilot channel, a forward MAC channel, and forward traffic channel(s).

The forward pilot channel is transmitted by each sector in each half slot on the forward channel. Each pilot channel transmission consists of unmodulated BPSK transmitted as 96 chip bursts every half slot at full sector power.

The pilot channel is used for acquisition, synchronization, demodulation, decoding and C/I estimation by all wireless terminals in the coverage area. By transmitting the pilot burst wise in this fashion, a sufficiently accurate C/I estimation can be obtained for data rate control generation and adaptive modulation and coding. Pilot bursts from all of the sectors are transmitted at the same time to facilitate C/I estimation.

Figure 2:
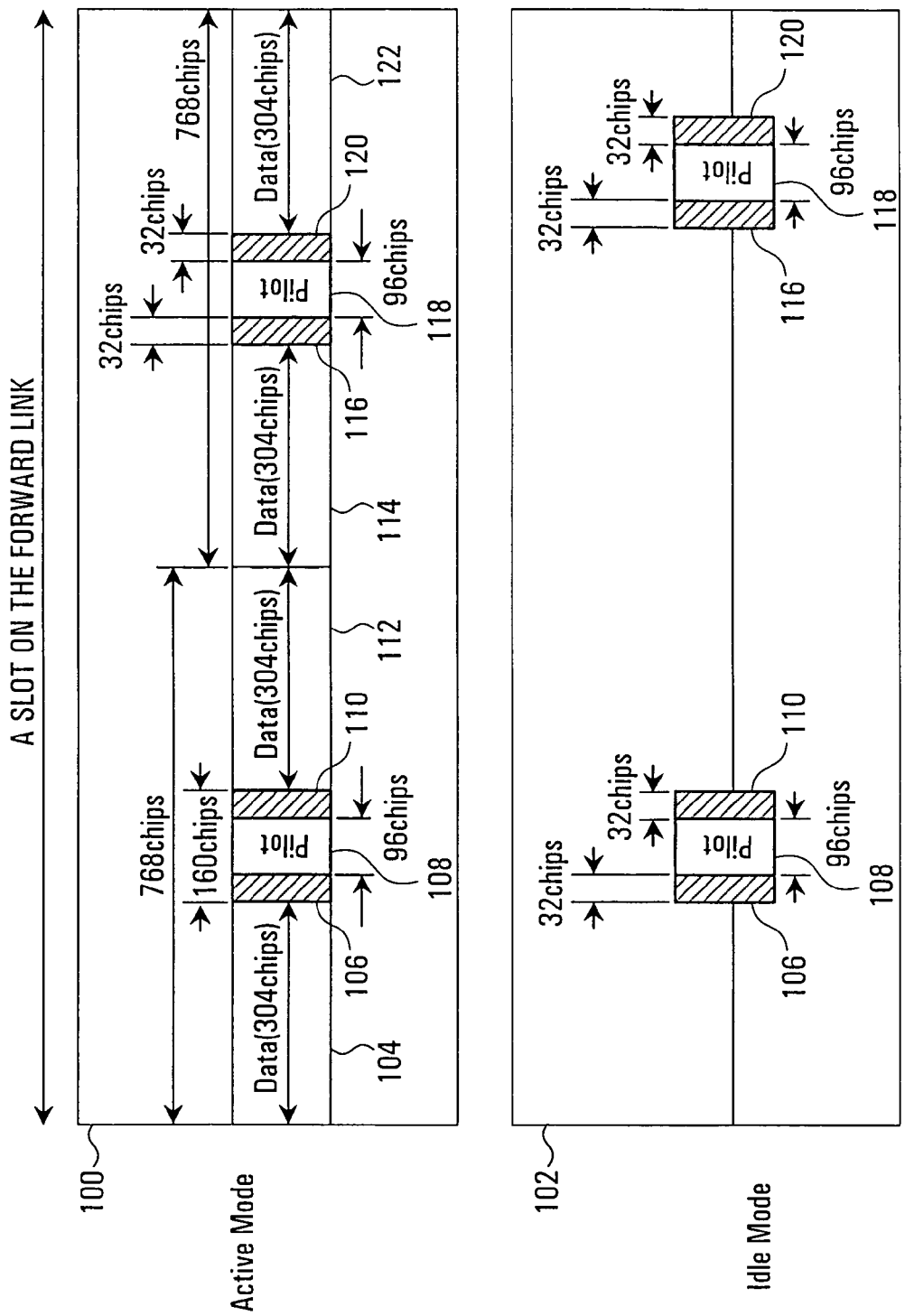
FIG. 2 is a first example of a forward link slot structure provided by an embodiment of the invention.

Referring to FIG. 2, shown is where in the slot the pilot bursts are transmitted for two modes, namely an active mode during which forward link data is being transmitted, generally indicated by 100, and an idle mode during which forward link data is not being transmitted, generally indicated by 102.

In active mode 100, a slot on the forward link (1.25 ms, 1536 chips) comprises a first 304 chip data period 104, a first 32 chip MAC channel slot 106, a 96 chip pilot burst 108, a second 32 chip MAC channel slot 110, second and third 304 chip data periods 112,114, a third 32 chip MAC channel slot 116, a second 96 chip pilot burst 118, a fourth 32 chip MAC channel slot 120, and a fourth 304 chip data period 122. In the inactive mode 102, the MAC channel slots 106,110,116,120 and pilot bursts 108,118 are transmitted at the same time during the slot as was the case for the active mode, with the no data transmission during the data periods.

The forward MAC channel carries a reverse power control (RPC) channel and a reverse activity (RA) channel.

The forward traffic channel is provided over the four data periods 104,112,114,122, and is used to provide for different services with various QoS attributes, such as real time data, non-real time data, etc. In some slots, one or more of these data periods 104,112,114,122 are used to transmit a preamble which identifies which users are being scheduled during the slot.

Referring again to FIG. 2, the data periods 104,112,114, 122 are used for a time division multiplexed forward traffic channel, the time division multiplexing occurring between data transmission, and pilot and MAC channel slot transmission. Advantageously, this allows a higher number of users per slot with modest rate requirements, or a modest number of high-rate voice and data users.

During the data periods 104,112,114,122, a number of CDMA Walsh covers are used to transmit forward traffic channels. Preferably, 16 16-ary Walsh covers are used. The Walsh covers are allocatable on a per slot basis such that a single slot is adapted to serve multiple low data rate or voice users so as to provide efficiency and flexibility, and up to one high data rate user.

Each slot is either a multi-user slot, or a single high-rate user slot. For a single user slot, all 16 Walsh covers are used to transmit data to the single high-rate user. In a multi-user slot, the 16 Walsh covers are allocated between up to 16 users, with one, two or four Walsh covers per user.

Each multi-user slot has a preamble which identifies the users who are being scheduled during the slot. Single user packets may be transmitted over multiple slots, and the first of such multiple slots contains a preamble identifying the data user and transmission parameters for the data packet.

The base station schedules data packets onto the forward traffic channel based on channel estimates fed back over the CHESS channel received from wireless terminals on the reverse link, QoS requirements and traffic load at the base station. The base station must schedule at least one voice frame onto the forward traffic channel for each simultaneous voice and data user within one 20 ms frame. The actual rate for a single user slot is specified by an EDRI (explicit data rate indicator).

Figure 3:
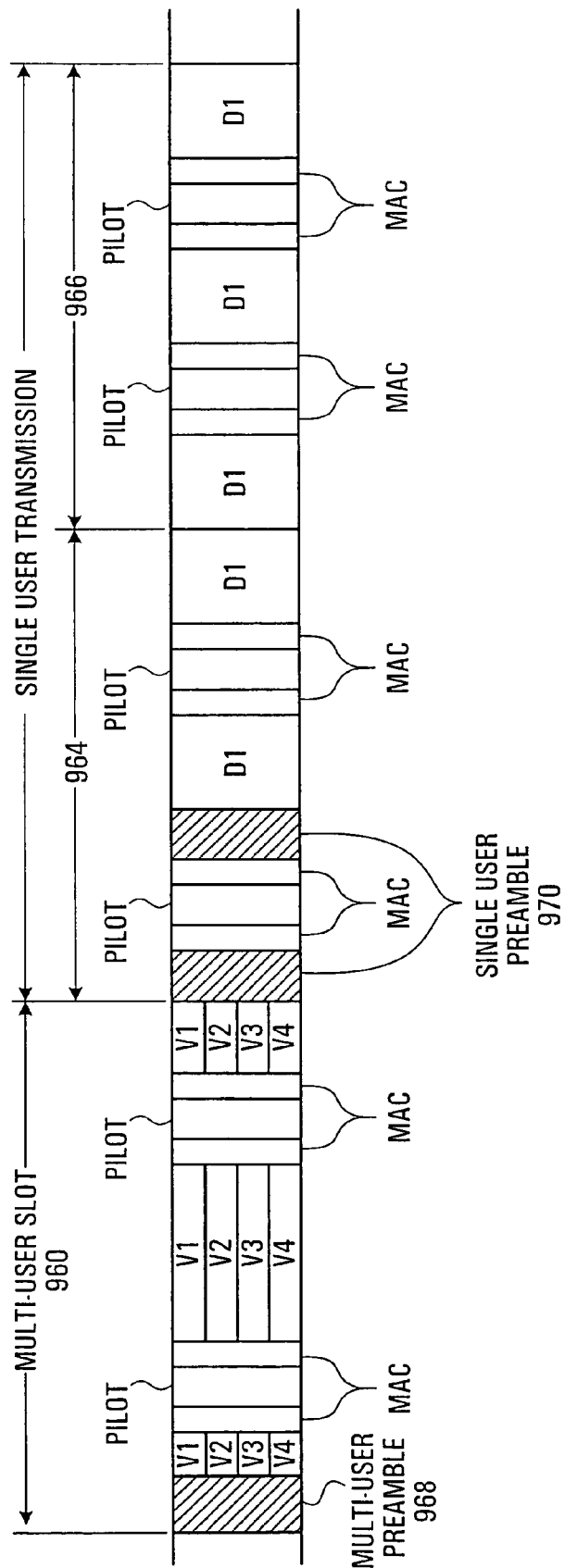
FIG. 3 illustrates an example of how content might be scheduled using the slot structure of FIG. 2.

FIG. 3 illustrates an example slot scheduling breakdown for a multi-user slot 960 and a single user transmission 962 composed of two slots 964,966. All three slots 960,964,966 have a pair of respective pilot periods, and four respective MAC channel slots. Multi-user slot 960 has a multi-user preamble 968 which in this example identifies (through user index construct, described below) four voice users each occupying 4 Walsh codes. The transmissions for the four voice users are indicated as V1, V2, V3 and V4. For the single user transmission, the first slot 964 contains a preamble 970 which identifies (through the group ID construct) the data user. The entire traffic capacity of the slot 964 and the following slot 966 is dedicated to the single user as indicated by D1 in both slots.

Figure 4:
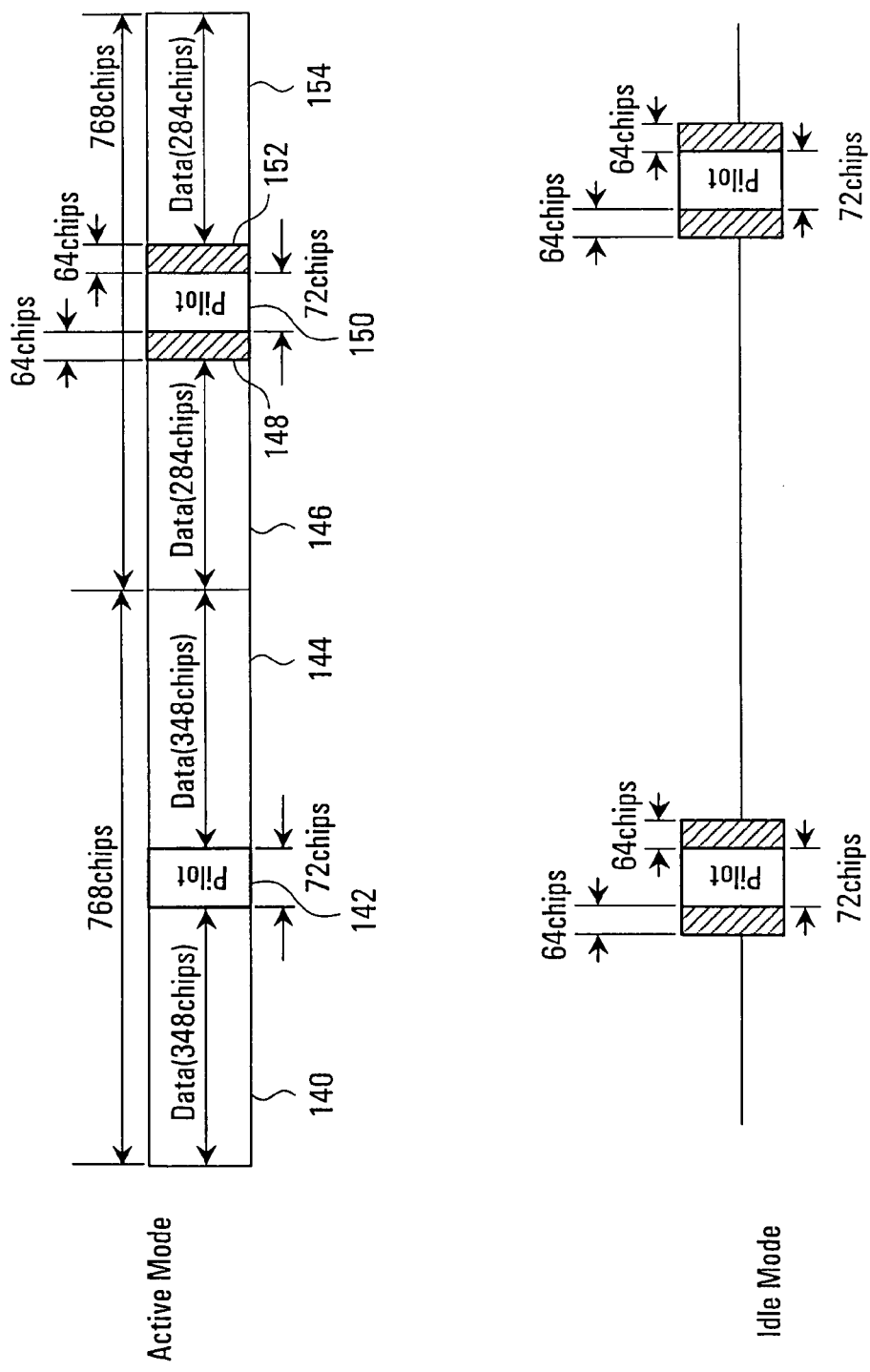
FIG. 4 is a second example of a forward link slot structure provided by an embodiment of the invention.

It is to be understood that other field sizes may alternatively be employed for the MAC channel slots, pilot and data periods. Another example is shown in FIG. 4 for both active and idle modes where in a 1536 chip slot, there are be two 348 chip data periods 140,144, two 72 chip pilot bursts 142,150, two 64 chip MAC channel slots 148,152, and two 284 chip data periods 146,154.

Figure 1B:
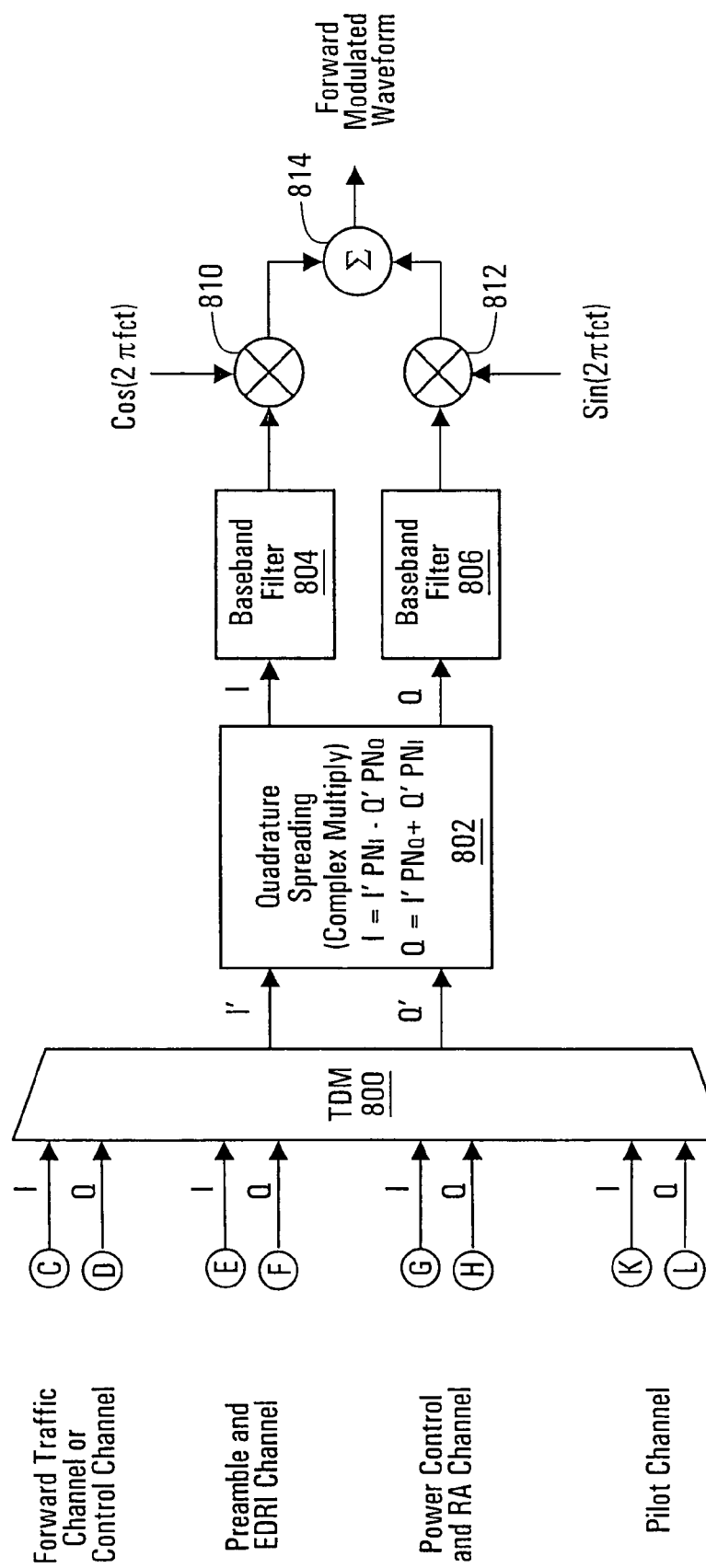
FIG. 1B is an example forward channel structure for use in the forward link of FIG. 1A.

The forward channel structure is shown in FIG. 1B. The forward traffic or control channel inputs C,D, the preamble and ERDI inputs E,F, the power control and RA channel inputs G,H and the pilot channel inputs K,L are input to TDM (time division multiplexing) block 800 which performs time division multiplexing as shown in FIG. 2 for example. Quadrature spreading is performed at block 802. I and Q outputs are baseband filtered 804,806, modulated at 810,812 and then summed together at 814 to produce a forward modulated waveform.

Figure 1C:
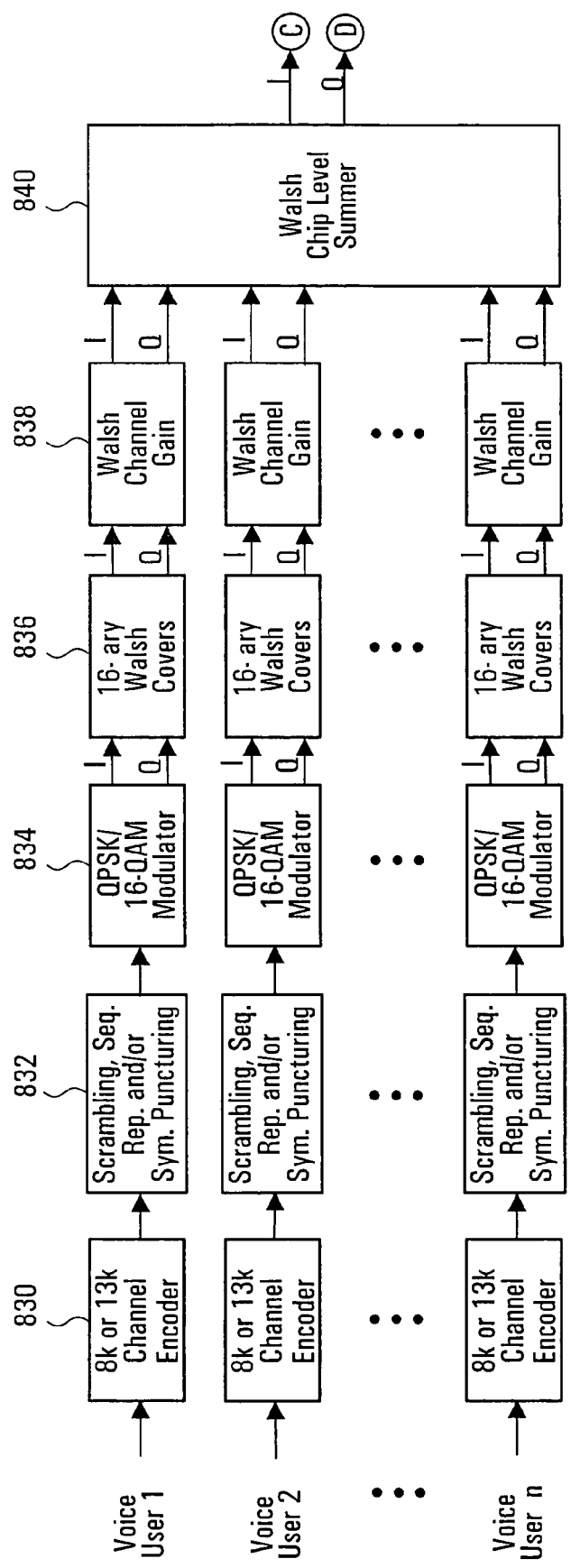
FIG. 1C is an example forward voice traffic channel structure for use with the forward channel structure of FIG. 1B.

The forward voice traffic channel structure is shown in FIG. 1C. A voice user may be assigned more than one Walsh cover, and preferably one, two or four Walsh covers. A voice user input is channel encoded 830, with an 8K or 13K encoder for example. Then scrambling, sequence repetition and/or symbol puncturing is performed at 832. Next, QPSK or 16 QAM modulation is performed 834. Walsh cover is applied 836 and Walsh channel gain applied 838. Finally, the outputs thus produced for all the voice users are summed with Walsh Chip level summer 840. Outputs C and D are inputs to the forward channel structure of FIG. 1B.

Figure 1D:
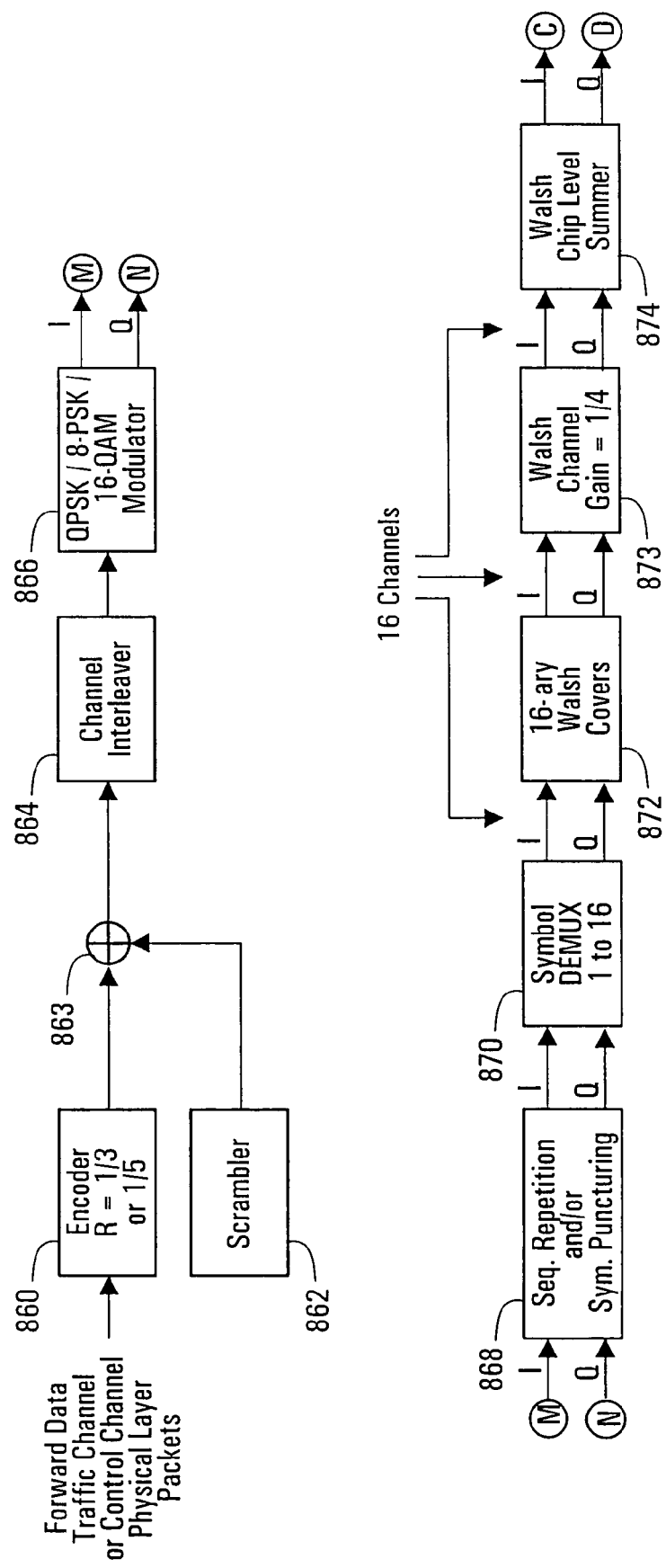
FIG. 1D is an example forward data traffic channel structure for use with the forward channel structure of FIG. 1B.

The forward single user data traffic channel structure is shown in FIG. 1D. Forward data traffic channel physical layer packets are encoded with R=⅓ or ⅕ rate encoder 860. A scrambler 862 sequence is added at 863. Then channel interleaving is employed 864 and modulation is performed by QPSK/8PSK or 16 QAM modulator 866. Symbol repetition and/or symbol puncturing is performed at 868. Symbol demultiplexing 16 to 1 occurs at 870. Then the appropriate Walsh cover is applied for each of the sixteen channels at 872, Walsh channel gain applied at 873, and Walsh chip level summing occurs at 874. Outputs C and D are inputs to the forward channel structure of FIG. 1B.

Figure 1E:
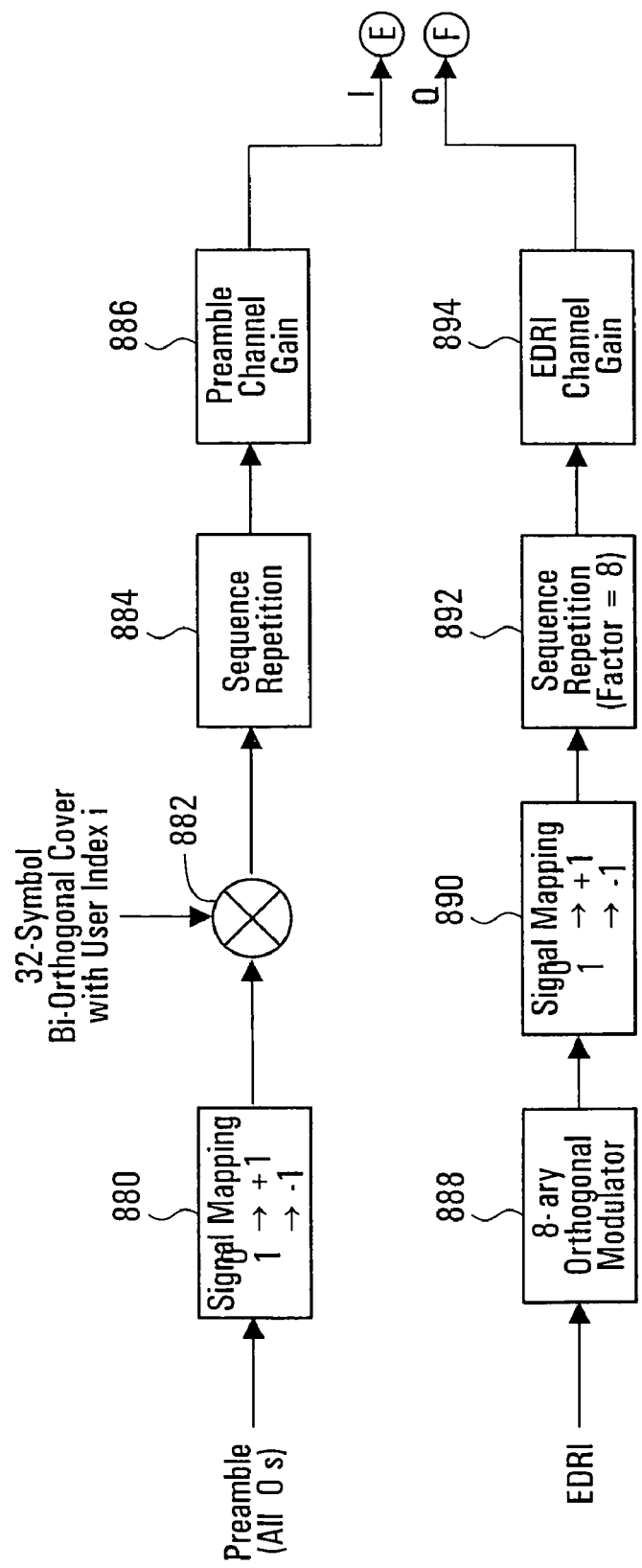
FIG. 1E is an example preamble channel structure for use with the forward channel structure of FIG. 1B.

The preamble channel structure is shown in FIG. 1E. The preamble initially consists of all 0's. This is signal mapped at 880. Then, a 32 symbol bi-orthogonal cover with user index/Group ID i is applied at 882. Sequence repetition is performed at 884, and a preamble gain applied at 886. For the EDRI, 8-ary orthogonal modulation is applied at 888, signal mapping occurs at 890, sequence repetition occurs at 892, and an EDRI channel gain applied at 894. Outputs E and F are inputs to the forward channel structure of FIG. 1B. The EDRI indicates the coding and modulation employed for the single high-rate user.

There are 32 Walsh×2(plus,minus) possible bi-orthogonal codes which may be applied to the preamble structure above, thereby allowing the identification of 64 different user index/Group ID.

The preamble channel structure used in multi-user slots is shown in FIG. 1E, but no EDRI is required.

Each data user has a single Group ID for their data service (this being analogous to user index I), and this is transmitted during the preamble of a single user slot as indicated above in the discussion of FIG. 1B. Each voice user has three Group IDs, one GID1 for use when its voice is transmitted using one 16-ary Walsh cover, one GID2 for use when its voice is transmitted using two 16-ary Walsh covers, and one GID4 for use when its voice is transmitted using four 16-ary Walsh covers. Each user has Walsh covers assigned to it for each of the its three Group IDs, i.e. for GID1 the user is assigned one Walsh cover, for GID2 the user is assigned two Walsh covers, and for GID4 the user is assigned four Walsh covers. Multiple users may be assigned the same GIDs. When a given GID1 is transmitted, then all voice users having been assigned GID1 will know to expect a voice packet on the single Walsh cover associated with GID1. Similarly, when a given GID2 is transmitted, then all voice users having been assigned GID2 will know to expect a voice packet on the two Walsh covers associated with GID2, and when a given GID4 is transmitted, then all voice users having been assigned GID4 will know to expect a voice packet on the four Walsh covers associated with GID4. The preamble functions as a user identification channel, allowing users to determine whether a given slot contains any content for them.

Figure 1F:
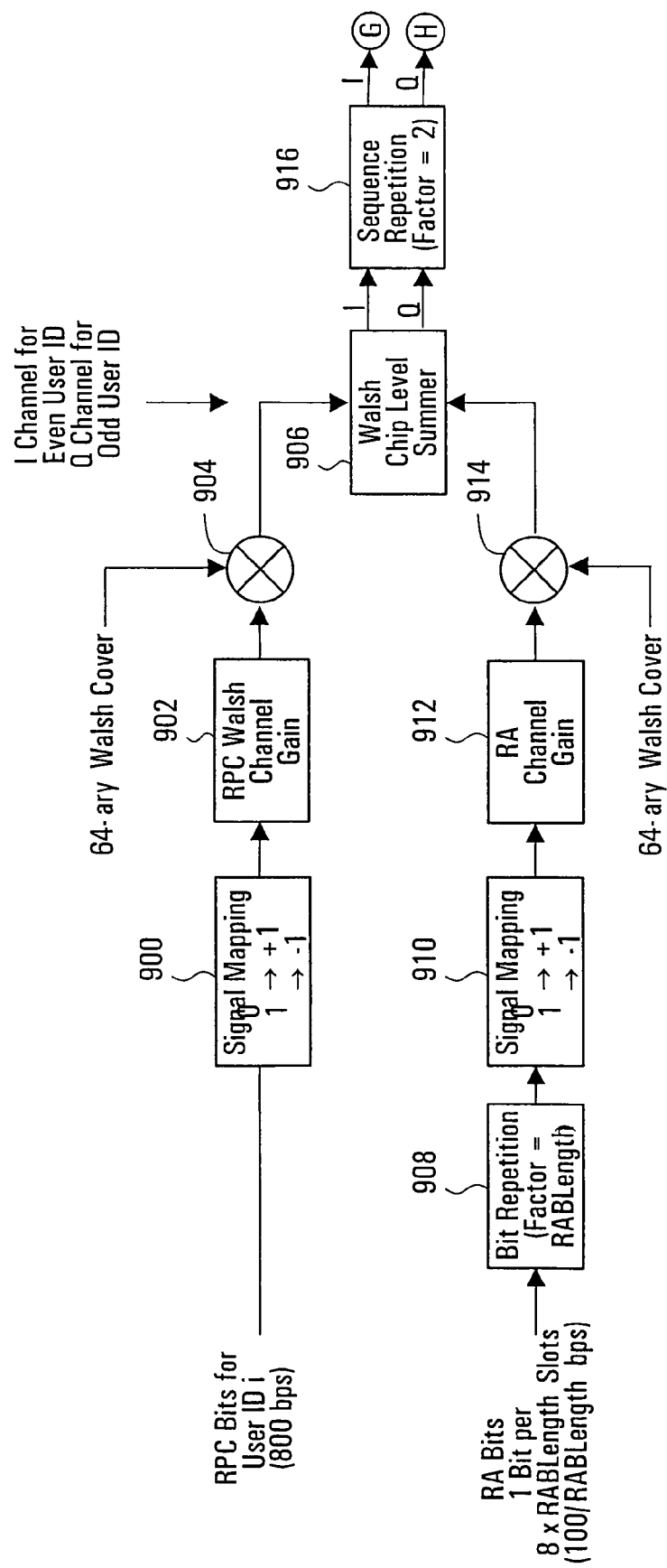
FIG. 1F is an example power control and reverse activity channel structure for use with the forward channel structure of FIG. 1B.

The structure of the MAC channel slots 106,110,116,120 is designed to facilitate this denser and more flexible packing of users down to the sub-slot level. The structure of the MAC channel which is used to carry reverse power control commands and reverse activity commands is shown at FIG. 1F. RPC bits for user ID i are signal mapped 900. Then RPC Walsh channel gain is applied at 902. A 64-ary Walsh cover is applied at 904. RA bits, 1 per 8xRABLength slots (100/RABLength bps) are input to bit repetition block 908 with repetition factor equal to RABLength. Then, signal point mapping occurs at 910 and an RA channel gain is applied at 912. A 64-ary Walsh cover is applied at 914. The outputs of 904 and 914 are summed with Walsh chip level summer 906 which has an output which is sequence repeated 916. Outputs G and H are inputs to the forward channel structure of FIG. 1B. The MAC channel provides one PC bit per slot for up to 63 users and one RA bit per slot. A first state of the RA bit indicates to all users transmitting on the reverse link that things are fine as they stand, and a second state of the RA bit indicates to all users transmitting on the reverse link that there is too much activity on the reverse link and that data rates should be lowered.

Figure 1G:
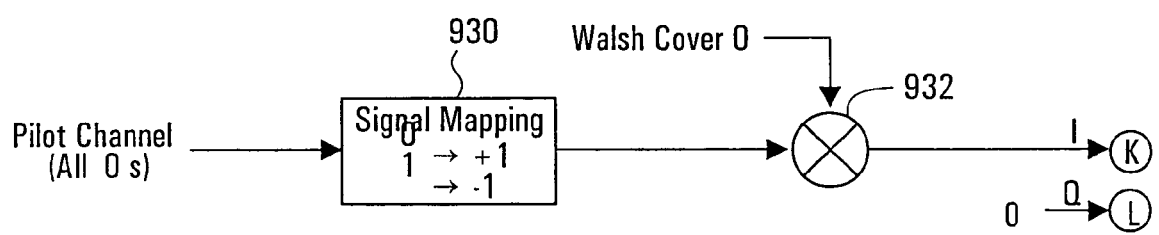
FIG. 1G is an example forward pilot channel structure for use with the forward channel structure of FIG. 1B.

Finally, the pilot channel structure is shown in FIG. 1G. Here, the pilot channel bits which consist of all 0's, are signal mapped at 930 and then the Walsh cover 0 is applied at 932. Outputs K and L are inputs to the forward channel structure of FIG. 1B.

The forward link physical layer parameters for data are shown in FIG. 5A. Data packets can be from 1 to 16 slots in length. The preamble for the different possibilities also varies from being as small as 128 chips to as large as 1024 chips. When the preamble is longer, the user index/group ID for the data user is repeated.

The forward link physical layer parameters for voice are shown in FIG. 5B, 5C and 5D for users having high, medium and low channel estimates respectively. In FIG. 5B, the parameters are used when there are 16 voice users, with one Walsh code per user. FIG. 5C shows the parameters used when there are eight users with two Walsh codes per user. FIG. 5D shows the parameters used when there are four users with four Walsh codes per user.

Forward Link—Code Division Multiplexed Control Implementation

Figure 6:
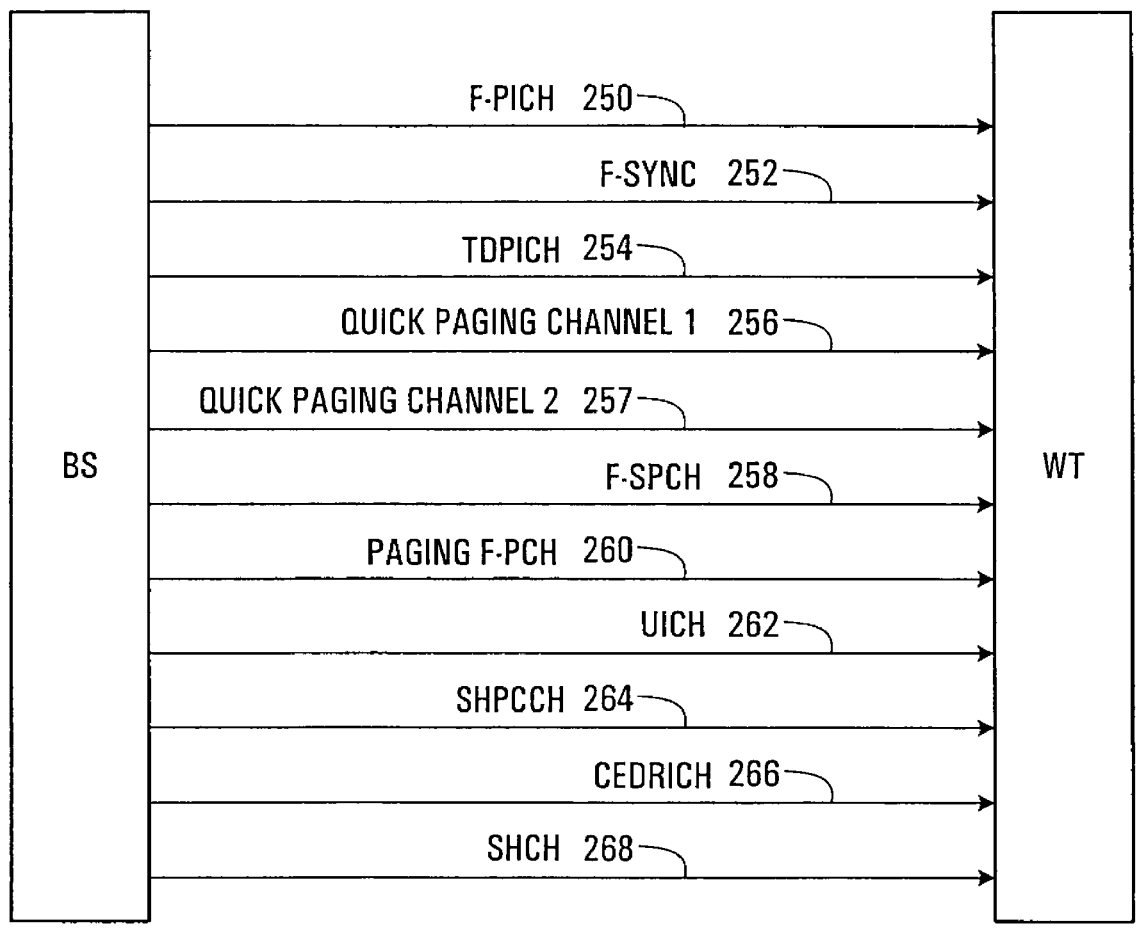
FIG. 6 is a channel summary for another CDMA forward link structure provided by an embodiment of the invention.

Another embodiment of the invention provides a forward link design in which control is multiplexed with data using code multiplexing. This embodiment will now be described with reference to FIGS. 6 to 16. The new channel breakdown for the forward link is shown in FIG. 6. The forward channels include:

Forward Pilot Channel (F-PICH) 250;
Forward Sync Channel (F-SYCH) 252;
TDPICH channel 254;
Supplemental Paging Channel (F-SPCH) 258;
Quick Paging Channel 1 256;
Quick Paging Channel 2 257;
Forward Paging Channel (F-PCH) 260;
User identification channel (UICH) 262;
Forward Shared Power Control Channel (F-SHPCCH);
Common Explicit Data Rate Indication Channel (CEDRICH) 266; and
Shared Channel (SHCH) 268.

Preferably, the pilot channel 250, sync channel 252, TDPICH channel 254, quick paging channels 256,257, and paging channel 260 have the same channel structure as the corresponding channels as defined by IS2000A. Furthermore, preferably, the shared power control channel 264 has a similar structure to the CPCCH (common power control channel) provided by IS2000A, with differences noted below. Each of the channels which are not based on IS2000A are described in detail below.

Forward Link Operation.

The forward link uses code division multiplexing within time division multiplexing on a new shared channel (SHCH). The SHCH allows flexible slot scheduling and slots with multiple voice users and up to one data user. Forward link transmission is organized as 20 ms frames. Each frame consists of sixteen 1.25 ms slots. Each slot contains 1536 chips.

Figure 7:
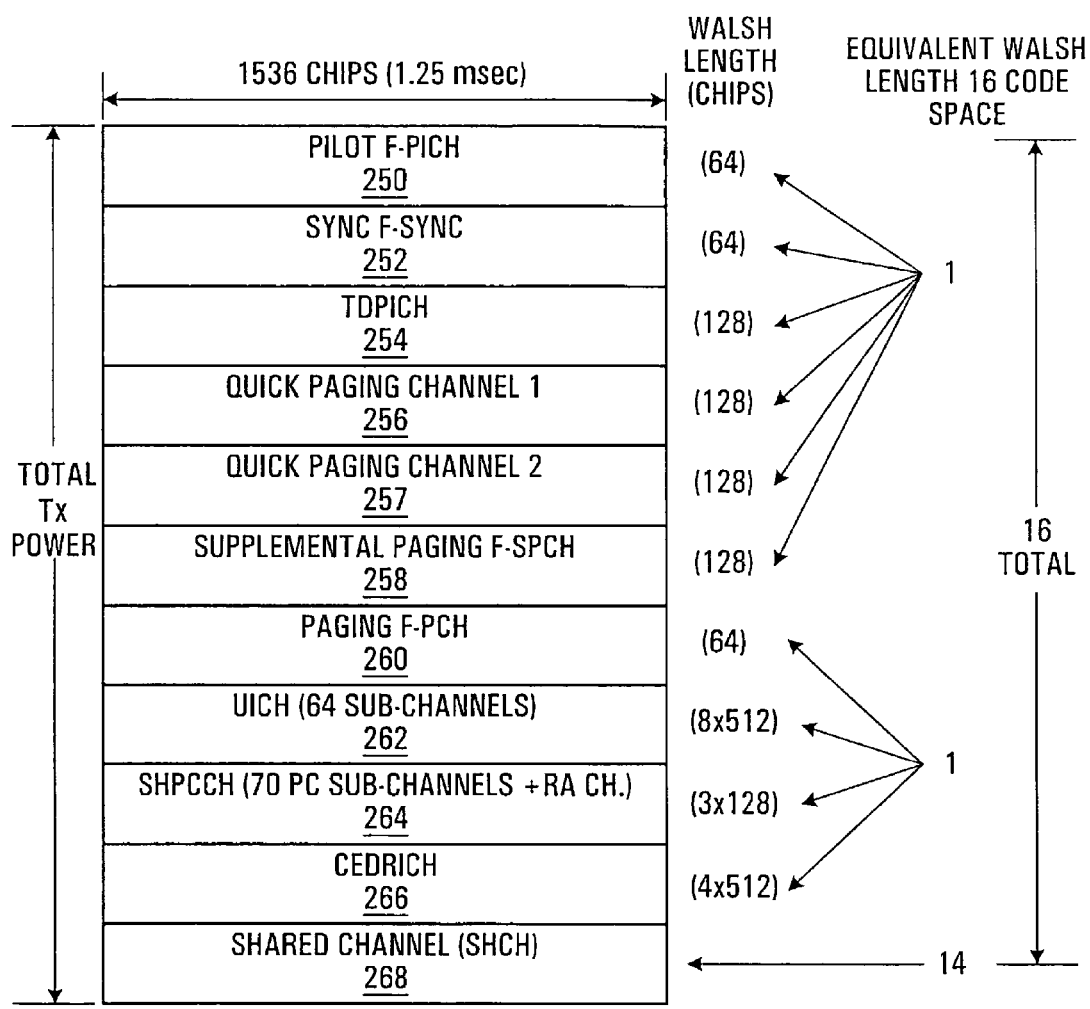
FIG. 7 is a slot structure of a forward link structure in which there are no legacy users.

The slot structure of the forward link depends upon whether service is to be provided to legacy IS95/1xRTT users. A forward slot/code structure is shown in FIG. 7 for the case where it is assumed there are no IS95/1xRTT users. Effectively, there are 16 Walsh length 16 code space sub-channels.

The slot structure contains the following channels: Forward Pilot Channel (F-PICH) 250 having a Walsh length of 64 chips, Forward Synch Channel (F-SYCH) 252 having a Walsh length of 64 chips, the TDPICH channel 254 having a Walsh length of 128 chips, the supplemental paging channel F-SPCH 258 having a Walsh length of 128 chips. The slot structure has quick paging channels 256,257 each having a Walsh length of 128. Channels 250,252,254,256,257 and 258 collectively effectively occupy one Walsh 16 code space. The slot structure also has Forward Paging Channel (F-PCH) 260 having a Walsh length of 64 chips, and eight user identification channel (UICH) 262 each having 8 sub-channels and Walsh code of length 512 chips, for a total of 64 UICH sub-channels. If additional user identification channel capacity is required, then additional Walsh codes can be assigned code space permitting. Space may also be taken from the shared channel if necessary. The slot structure further includes three Forward Shared Power Control Channels (F-SHPCCH) 264 each having 24 sub-channels and a Walsh length of 128 chips, giving a total of 72 power control bits per slot capacity since for each of the three code channels, 24 power control bits can be time division multiplexed and transmitted. Preferably, two of the power control bits are used by the Reverse Activity (RA) channel, which are used to broadcast reverse activity commands and can be used for reverse link rate control. It is noted that six bits of the FSPCCH are preferably used for the advanced access channel described in applicant's co-pending application. If additional power control sub-channels are required, then extra code space may be allocated for this purpose. The slot structure also has a common explicit data rate indication channel (CEDRICH) 266 which has four Walsh codes of length 512 chips. Channels 260,262,264 and 266 collectively effectively occupy one Walsh 16 code space. Finally, the shared channel (SHCH) 14 which occupies 14 Walsh 16 code spaces. A detailed example breakdown of the Walsh separation is provided in the table of FIG. 9.

Figure 8:
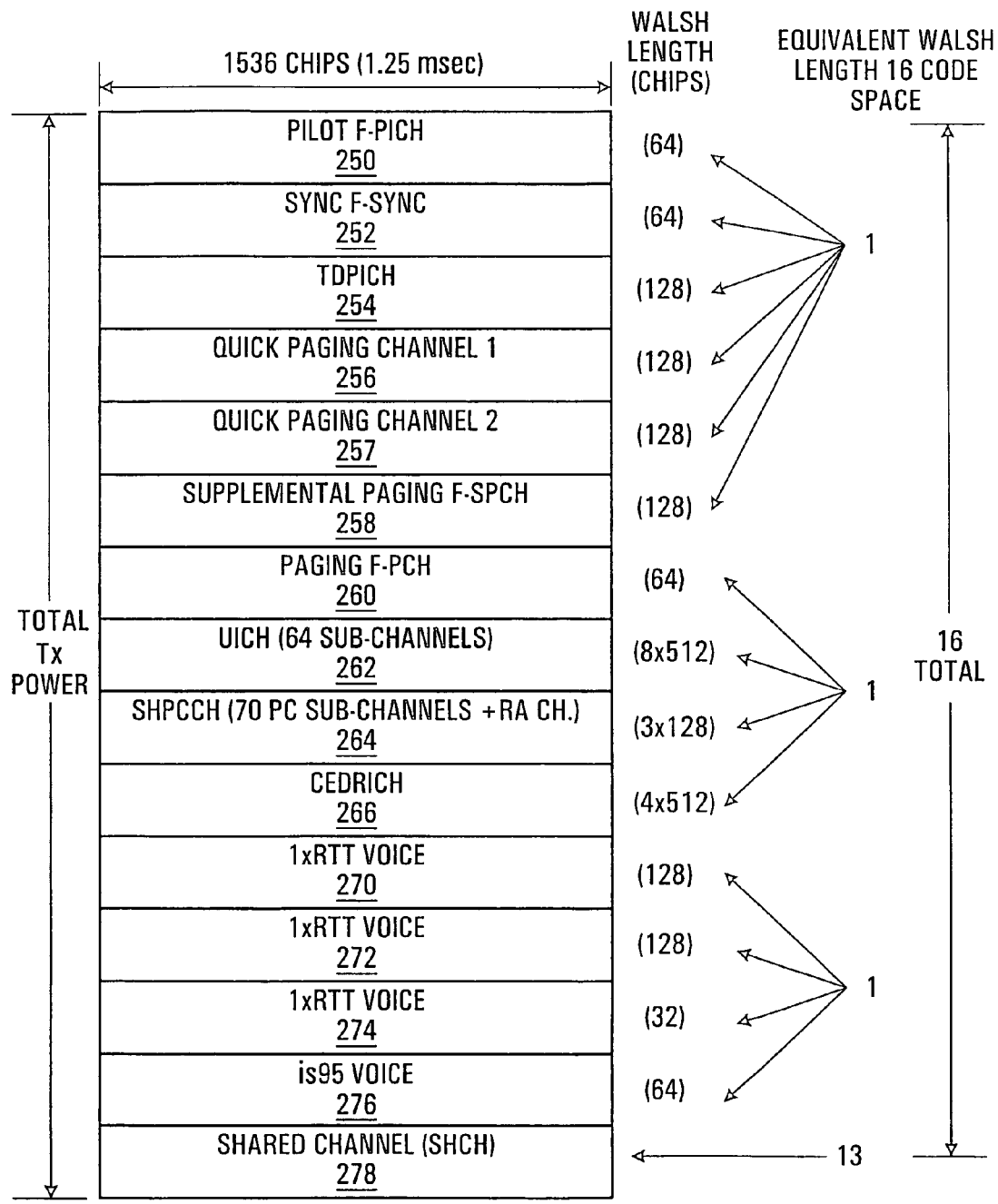
FIG. 8 is a slot structure of a forward link structure in which there are legacy users.

In the event there are IS95/1xRTT (legacy) users which need to be supported, the slot structure of FIG. 7 easily adapts to allow this. A subset of the capacity of the shared channel 268 can be used for these legacy users. An example is shown in FIG. 8 for the case where it is assumed there are IS95/1xRTT users. The slot structure is the same as that of FIG. 7 down until the shared channel. The slot structure of FIG. 8 has two 1xRTT voice channels 270,272 each having a Walsh length of 128, one 1xRTT data channel 272 having a Walsh length of 32, and one IS95 voice channel 276 having a Walsh length of 64, these legacy channels collectively occupying one Walsh 16 code space which was taken from the capacity formerly allocated to the shared channel leaving a smaller Shared Channel (SHCH) 278 is which occupies 13 Walsh code spaces rather than 14 as was the case for the Shared Channel of FIG. 7. Depending on the number of legacy users at a given time, the size of the shared channel 278 can shrink, potentially down to zero, or grow back to the maximum 14 Walsh code spaces nominally allocated.

Forward link Shared Channel (SHCH)

The shared channel 268 is a very flexible channel. The shared channel, in this example, may have up to 14 16-ary Walsh codes.

In one embodiment, each SHCH 1.25 ms slot is assignable on a TDM basis for a combination of voice users plus a single data user, or for a single high-rate data user.

The assumption being made is that the high-rate data user does not require real time traffic delivery. For a given user, it is acceptable to wait until enough information has built up to fill an entire slot for the user and/or to wait until the channel to the given user is good.

In one embodiment, the SHCH has a fixed bandwidth. In another embodiment, the SHCH has a bandwidth equal to a maximum bandwidth minus a bandwidth required to service legacy voice and low-rate data users. More specifically, in this embodiment space on the shared channel 268 can be taken as needed to support legacy voice and data channels, thereby reducing the size of the shared channel 268.

Nominally, the shared channel is scheduled on a 1.25 ms basis. However, for high rate data users, longer scheduling periods of 1.25, 2.5 and 5 msec may be allowed.

A data-only SHCH slot has all 14 available 16-ary Walsh codes allocated to a single user's data. Alternatively, if some of the SHCH 16-ary Walsh codes have been allocated for legacy traffic, then a data-only SHCH preferably uses all the remaining SHCH 16-ary Walsh codes.

A hybrid SHCH slot has the 14 available 16-ary Walsh codes (or whatever number are available after servicing legacy users) split between one or more voice users and up to one data user. Voice users may take up all of the SHCH 16-ary Walsh codes.

A number of different modulation and coding schemes are preferably supported for voice users as summarized in FIG. 12 including full, half, quarter and eighth rate. Full rate voice uses Turbo coding and can use either one or two SHCH 16-ary Walsh codes depending upon the channel estimates (CHE) fed back to the base station and other factors. Half, quarter and eighth rate voice uses convolutional coding and uses only one SHCH 16-ary Walsh code. The wireless terminal must blindly distinguish between the five possibilities based on getting the correct CRC. Per voice user gain is also adjusted based on the CHE.

A number of different modulation and coding schemes are also supported for the high rate data user as summarized in the tables of FIGS. 13 and 14. Other rates may also be supported. Data users adapt modulation and coding based on the Channel Estimate (CHE) every 1.25 msec. Because the size of the portion of the shared channel which may be dedicated to a high-rate user varies as a function of how many voice and legacy users are also scheduled in the same slot, many different effective data rates are required.

Figure 10:
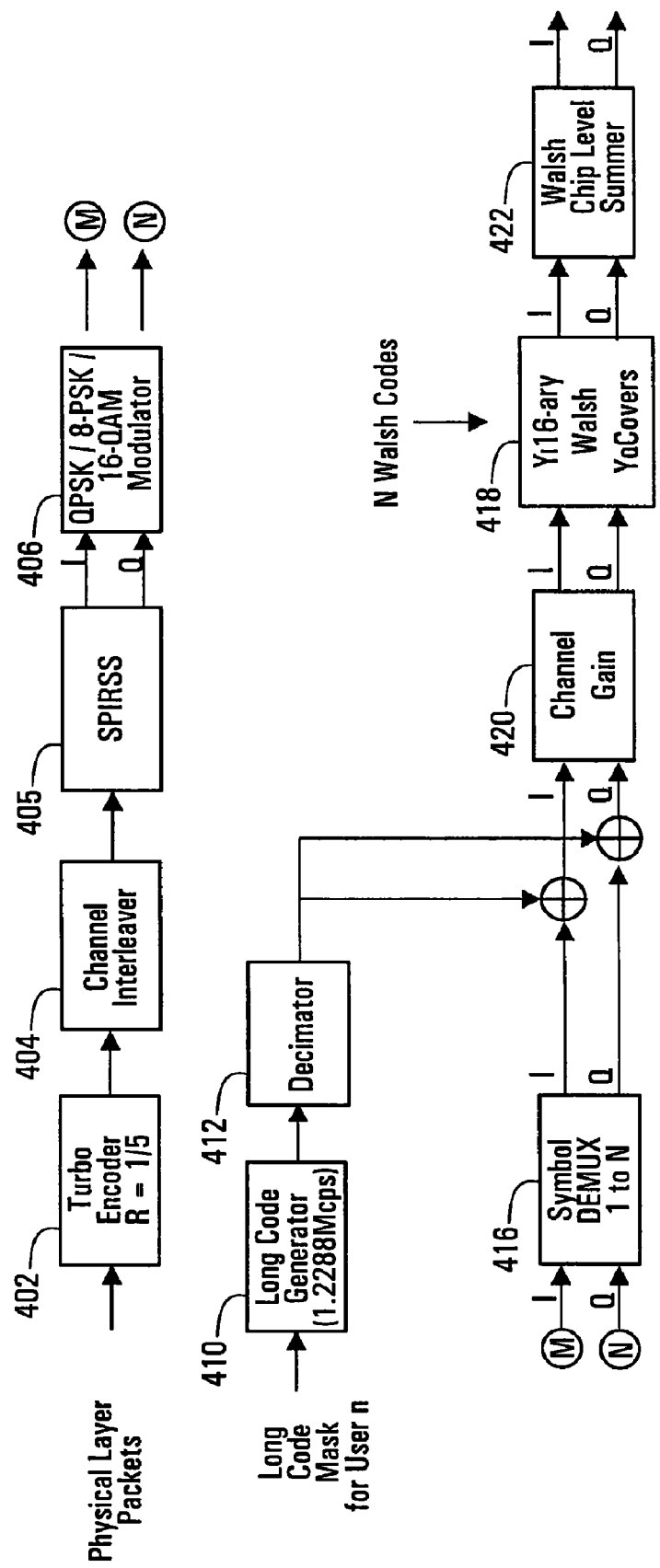
FIG. 10 is a block diagram of an example forward shared channel structure for data and full rate voice.

A preferred forward shared channel structure for a single high-rate data user which is the same as that for a single full rate voice user is shown in FIG. 10 where it is assumed that the user has N Walsh codes. The single high-rate data user may have up to all N=14 Walsh codes, while the voice user will have either one or two Walsh codes. Physical layer packets are encoded with ⅕ rate Turbo encoder 402 and then pass through channel interleaver 404 and preferably processed by SPIRSS block 405 and then modulated with modulator 406 (which may be QPSK, 8-PSK or 16-QAM depending upon modulation type). The symbols thus produced are 1 to N demuxed 416 and the appropriate long code is added, the long code being produced by applying the long code mask to a long code generator 410 followed by decimator 412. Walsh channel gain is applied 420, and the appropriate N Walsh covers 418 are applied. Finally Walsh chip level summing 422 occurs.

In one embodiment of the invention, the even second timing referenced to UTC (Universal Coordinated Time) is used to select the portion of the ⅕ rate Turbo coded binary symbols to be transmitted over a given slot. Before describing this embodiment in detail, the following notations are defined:

N is the user payload packet size in number of symbols;

M is the coded packet size, which is the packed size (in number of symbols) after ⅕ rate Turbo coding, M=5N;

L is the actual transmitted packet size in number of symbols. The effective coding rate is N/L.

In both the access network and the wireless terminal, there is a count referenced to the even second. At the start of each even second, the count is cleared to zero. Then for each four slots (i.e. every 5 ms), the count is increased by one. Since there are 1600 slots in one even second period, the count value can go from 0 to 399. For example, if the starting position of the even second is aligned with the starting position of slot 0 of the current frame, the count value at slot 0, 1, 2, and 3 of the current frame would be 0. The count value at slot 4, 5, 6, and 7 of the current frame would be 1. The count value at slot 8, 9, 10, and 11 of the current frame would be 2. The count value at slot 12, 13, 14, and 15 of the current frame would be 3. The count value at slot 0, 1, 2, and 3 of the next frame would be 3 and so on.

The Turbo coded packet can be viewed as a periodic signal with the period equal to M. The actual transmitted packet will be selected from the periodic coded packet based on the count value at the current slot on which it will be scheduled on. If the packet to be transmitted requires more than one slot, it will be selected from the periodic coded packet based on the count value at the first slot.

Suppose that the count value at the current slot is k. The starting position of the actual transmitted packet is calculated from $$i1 = 1 + (kL) \text{ modulo } M.$$

The ending position of the actual transmitted packet is calculated from $$i2 = i1 + L - 1$$

When the wireless terminal receives the packet, it can derive the packet size information (N, M, L) from the CEDRIC channel (described in detail below). From the count value at the slot the packet is received (or at the first slot the packet is received if the received packet contains multiple slots), it knows which portion of the ⅕ rate Turbo coded data packet the received packet belongs to and decodes the packet in a proper way. If the decoded result does not pass CRC, the wireless terminal will check if the previous received packet is decoded correct or not. If the previous received packet is wrong, the current received packet will be used for soft combining and/or incremental redundancy with the previous received packet. If the previous received packet is correct or the joint decoded result is wrong, a NAK signal is sent to the base station. The current received packet will be stored and may be used for soft combining and/or incremental redundancy with the future received packet.

Figure 11:
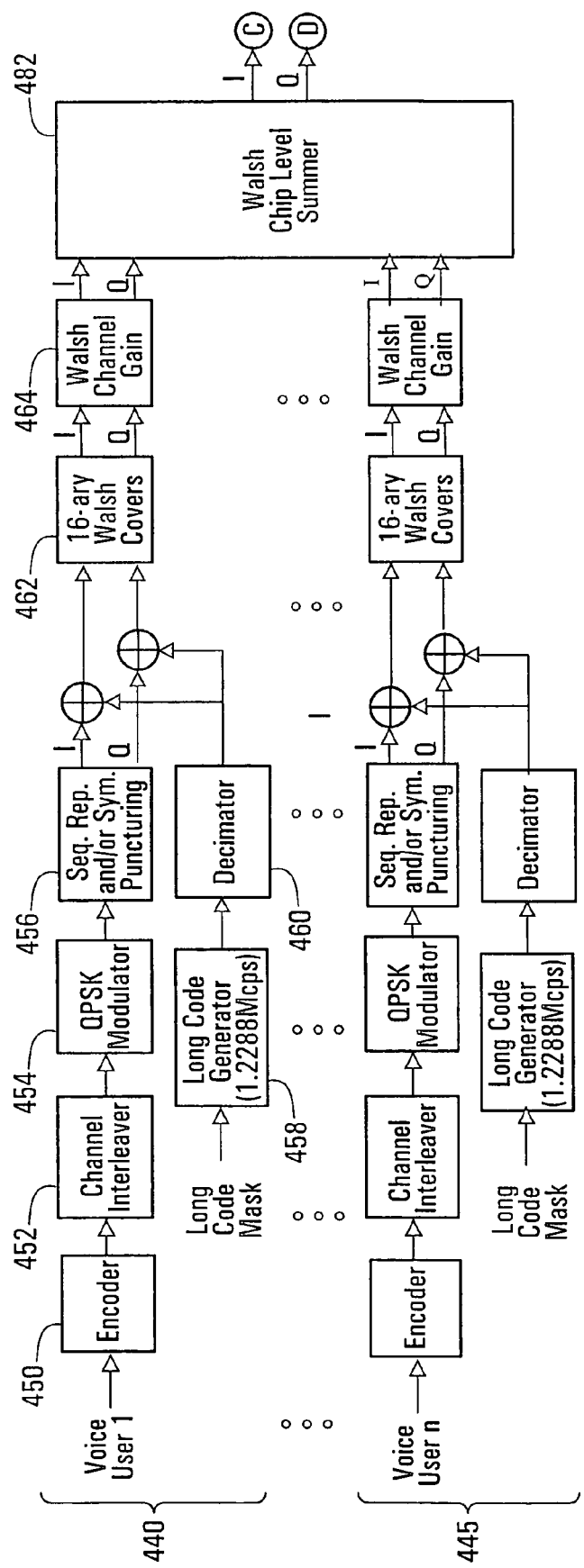
FIG. 11 is a block diagram of an example forward shared channel structure for non-full rate voice.

A preferred forward shared channel structure for non-full rate voice is shown in FIG. 11. There is a channel structure instantiation for each non-full rate voice user. In FIG. 11, two such identical channels structure are shown 440,445. Channel structure 440 will be described by way of example. Physical layer packets are encoded with encoder 450 and then pass through channel interleaver 452, and QPSK modulator 454. I and Q channels thus produced then undergo sequence repetition and/or symbol puncturing 456. The appropriate long code is added, the long code being produced by applying the long code mask to a long code generator 458 followed by decimator 460. The appropriate Walsh cover 462 is applied, Walsh channel gain 464 is applied, and finally Walsh chip level summing 482 occurs.

SHCH and Hybrid SHCH slots are scheduled by the base station, and wireless terminals are informed of whether a given slot contains voice/data for it using the User Identifier Channels (UICH).

A user identification channel (UICH) is a forward channel which provides a method of informing a wireless terminal of whether a current slot of the shared data channel contains his/her data. In a preferred embodiment, eight Walsh codes of length 512 are allocated for the UICH channel. A user's identification transmitted on this channel consists of a three bit sub-identifier transmitted using an I or Q component of one of the eight Walsh codes. There are four different three bit sub-identifiers as follows:

| | |
|---|---|
| Identifier 1: | 000 |
| Identifier 2: | 010 |
| Identifier 3: | 110 |
| Identifier 4: | 101 |

Figure 15:
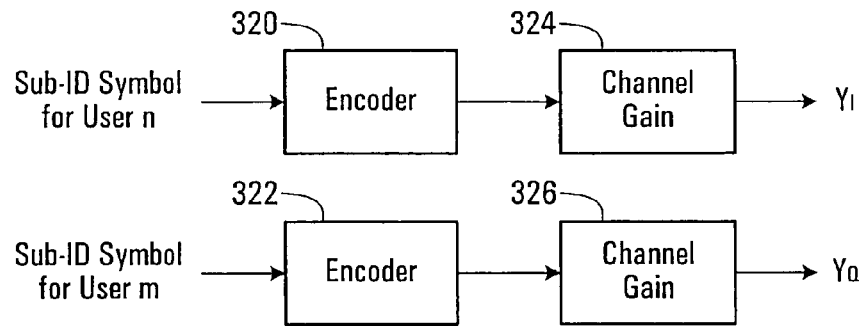
FIG. 15 is a block diagram of an example user identification channel structure.

In each slot, a sub-identifier is spread by a 512-ary Walsh code and can be transmitted on either I or Q components. Since I and Q components can be detected independently and eight Walsh codes are used for the UICH, there is a total of 64 users (8 Walsh codes×2 components×4 sub-identifiers) which can be identified uniquely by the channel. For each slot, up to sixteen users can be identified. The UICH channel structure is shown in FIG. 15. The mapping between a given user and a UICH identifier is set up each time a wireless terminal connects. Then, the sub-identifiers to be transmitted on the I and Q components are encoded with encoders 320,322, provided with channel gain with channel gain elements 324,326, and then Walsh code covered (not shown) and transmitted.

The above-described User Identifier Channels (UICH) indicate which user or users are scheduled in the current slot. Up to sixteen users may be identified per slot. A user with simultaneous Data and Voice has one UICH for Data and one UICH for Voice. The user is informed of its UICH(s) when during initial signaling with the base station.

More generally, the sub-identifier is an N bit identifier, and the Walsh code is one of P M-ary Walsh codes. The user identification channel is transmitted in K chip slots, and has I and Q channels, thereby providing the 2*K/(M) bit capacity, and the ability to transmit 2*K*M/N user identifiers per slot. In the above example, M=512, K=1536, N=3 and P=8 thereby providing the ability to transmit 16 user identifiers per slot, and the ability to uniquely identify 64 different users. In another specific example, M=512, K=1536, N=3, P=16 thereby providing the ability to transmit 32 user identifiers per slot, and the ability to uniquely identify 128 different users.

Preferably, voice users are scheduled in the first half frame (i.e. in the first eight slots). An ACK signal is sent by a wireless terminal if the wireless terminal receives a voice packet correctly. When the wireless terminal decodes the UICH correctly and detects the signal by measuring its energy and the CRC of the received voice packet fails, a NAK signal is sent to the base station. Otherwise, no ACK or NAK signal will be sent. When a NAK is received for a voice packet, the base station will re-transmit the packet unless the voice rate is ⅛ rate in which case the voice packet is not retransmitted.

Voice users are assigned a voice channel number (V=0, 1, 2, . . . ) which is used to calculate the one or two W16 codes on which it will receive voice information. The supplemental paging channel SPCH broadcasts the total number of 16-ary Walsh codes available (Nd) on the SHCH. For Data only SHCH slots, Nd will be the number of codes available to the data user. Also broadcast is the number of 16-ary Walsh codes available for voice in hybrid SHCH slots (Nv). In a hybrid slot, there would be Nd-Nv Walsh codes for the high rate data user. The Wx116 and Wx216 codes for a particular voice user are calculated by:

$X1=15-\mathrm{mod}(V,Nv)$ and $X2=15-\mathrm{mod}(V+1,Nv)$

Scheduling is performed on the basis of QoS commitments, the channel estimates received from the wireless terminals and sector select values. If a sector select erasure is received corresponding to a data user then no data will be scheduled for that user. If a sector select erasure is received corresponding to a voice user then voice information will continue to be scheduled for that user. Two sector select values corresponding to another valid sector must be received before the active sector stops sending voice information.

Figure 16:
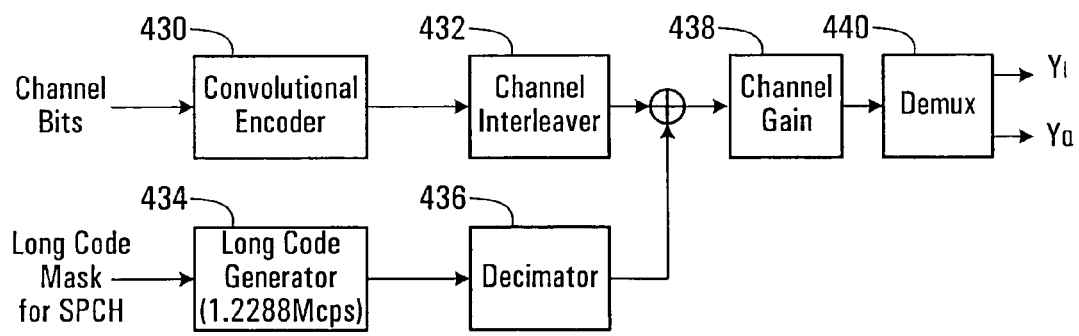
FIG. 16 is a block diagram of an example supplementary paging channel structure.

A preferred structure for the SPCH is shown in FIG. 16. The Supplemental Paging Channel (SPCH) broadcasts Nd and Nv as detailed above. The channel bits containing this information are convolutionally encoded with encoder 430, and interleaved with channel interleaver 432. A long code mask generated by long code mask generator 434 and decimator 436 is applied, and then channel gain 438 and demux functions 440 are performed.

The Common Explicit Data Rate Indication Channel (CEDRICH) is used to indicate the coding/modulation format applied for data only use of the shared channel. Another embodiment of the invention provides this channel used to determine the data rate for data transmitted on the Shared Channel. Preferably, four Walsh codes of length 512 are used for the channel.

The data rate can be determined from the number of Walsh codes used for data, the data packet size and packet length. The Supplemental Paging Channel broadcasts the number of Walsh codes for the Shared Channel and the number of Walsh codes used for voice when both voice and data are transmitted in the Shared Channel in a single slot. The CEDRIC channel carries the information of packet size, packet length and a slot type flag indicating whether the slot is for one data-only user or for multiple data and voice users. To help wireless terminals to do high order demodulation (64-QAM or 16-QAM), a gain value may be included in CEDRIC.

The CEDRIC is composed of three sub-channels. The first one (CEDRIC_a) carries the packet length in units of slots, and it is represented by three symbols (1536 chips after spreading) transmitted in I component of a Walsh code in a slot. The mapping between the symbols and packet length is specified in Table 2.

TABLE 2

The mapping between the symbols and packet length

| Packet Length (slots) | Symbols |
|---|---|
| 1 | No energy |
| 2 | 000 |
| 4 | 111 |

The second sub-channel (CEDRIC_b) carries information consisting of Data Packet Size and slot type flag for Low Order Modulation (QPSK and 8-PSK). The third sub-channel (CEDRIC_c) carries information consisting of Data Packet Size and slot type flag and the gain value for high order modulation (64-QAM or 16-QAM).

Each sub-channel uses different Walsh codes. For low order modulations, one Walsh code is assigned to carry the packet size information. Two packet sizes will be used if the packet is transmitted in one slot, therefore only one bit is needed to indicate the packet size (see Table 3). One more bit (slot type flag) is needed to indicate whether the slot is for one data-only user or for multiple data and voice users (see Table 4). Four packet sizes can be used when a packet is transmitted in multiple slots and two bits are needed to indicate the packet size (see Table 5). However, only data packets are transmitted in multiple slots and thus the slot type flag is not needed. In summary, for both single slot packets or multiple slot packets, two bits are encoded into six symbols, which are spread by a 512-ary Walsh code and transmitted on I and Q components.

TABLE 3

Packet Size Indication for Single Slot Packets

| Packet Size Flag | Packet Size |
|---|---|
| 0 | 3072 |
| 1 | 1536 |

TABLE 4

Slot Type Indication for Single Slot Packets

| Slot Type Flag | Slot Type |
|---|---|
| 0 | Data only |
| 1 | Mixed |

TABLE 5

Packet Size Indication for Multiple Slot Packets

| Packet Size Flag | Packet Size |
|---|---|
| 00 | 3072 |
| 01 | 1536 |
| 10 | 768 |
| 11 | 384 |

For high order modulations, two and a half Walsh codes (half meaning the Q component of the Walsh code used for packet length) are assigned to carry the packet size and the gain information. Similar to the low order modulation, a 1-bit packet size flag and a 1-bit slot type flag are used for single slot packets while a 2-bit packet size flag is used for multiple slot packets. Five bits are used to represent the gain. All seven bits are encoded into fifteen symbols and are spread by 512-ary Walsh codes.

If a packet is transmitted in a single slot, the packet size, slot type flag (and gain when applicable) will be transmitted in the same slot with the data packet. If a packet is transmitted in multiple slots, the packet length (number of slots) will be transmitted in the first slot. The packet size (and gain when applicable) will be transmitted in the following slots. Effectively, only one sub-channel is transmitted in one slot.

Shared Power Control Channels (SHPCCH) handle reverse link PC when forward link uses SHCH. Details of a preferred implementation are provided in Applicants below-referenced co-pending application.

The SHPCCH is used by the reverse advanced Access Channel (AACH). Predefined PC bits from the SHPCCH to acknowledge and to power control wireless terminal pilots prior to message transmission from wireless terminals during access probes.

Preferably, two bits are used to send a single reverse activity (RA) control bit repeated twice. A first state of the RA bit indicates to all users transmitting on the reverse link that things are fine as they stand, and a second state of the RA bit indicates to all users transmitting on the reverse link that there is too much activity on the reverse link and that data rates should be lowered.

NAK for Outer Loop Power Control

The base station adjusts the power transmitted to users on the basis of the channel estimate information fed back from the wireless terminals. Preferably, in another embodiment, NAK signals fed back from wireless terminals are used to determine a measure of frame error rate, and this measure is used for outer loop power control, i.e. to change the manner by which the channel estimates are mapped to base station transmission power. By counting the NAK and no ACK/NAK frames, the base station can calculate the forward link frame error rate. This error rate can then be used to make a decision in respect of outer loop power control. No other signaling from the reverse link is needed for this outer loop power control.

Reverse Link Operation

Details of a reverse link design provided by another embodiment of the invention used for reverse links 174,176 of FIG. 1 will now be provided.

Preferably, the reverse link is the 1xRTT reverse link with the addition of a new channel for feeding back channel estimates and sector selections, new channels for ARQ feedback and reverse rate indication, and a modified reverse supplementary channel having the data rate indicated by the Reverse Rate Indication (RRI) channel. Each 20 ms reverse link frame consists of 16 1.25 ms slots or power control groups. Code channels are used for multiplexing (fundamental, supplemental channels). A frame offset is applied to randomize the reverse link transmissions.

Figure 17A:
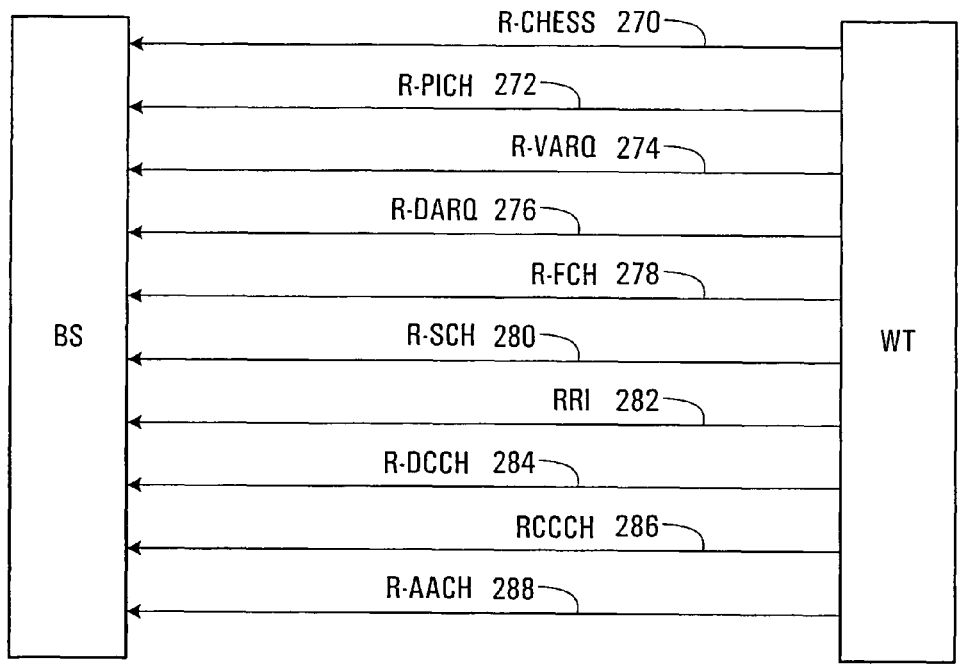
FIG. 17A is a channel summary for CDMA reverse link structure provided by an embodiment of the invention.

Referring now to FIG. 17A, the reverse link has the following channels:

a reverse pilot channel (R-PICH) 272;

reverse MAC channels consisting of the R-CHESS (reverse channel estimate and sector select) channel 270, RRI (reverse rate indicator) channel 282, reverse data ARQ (R-DARQ) channel 276, reverse voice ARQ (R-VARQ) channel 274;

reverse traffic channels which include reverse fundamental channel (R-FCH) 278 (for voice traffic) and reverse supplemental channel (R-SCH) 280 (for data traffic);

reverse advanced access channel (R-AACH) 288;

reverse dedicated control channel (R-DCCH) 284; and reverse common control channel (RCCCH) 286.

Figure 20:
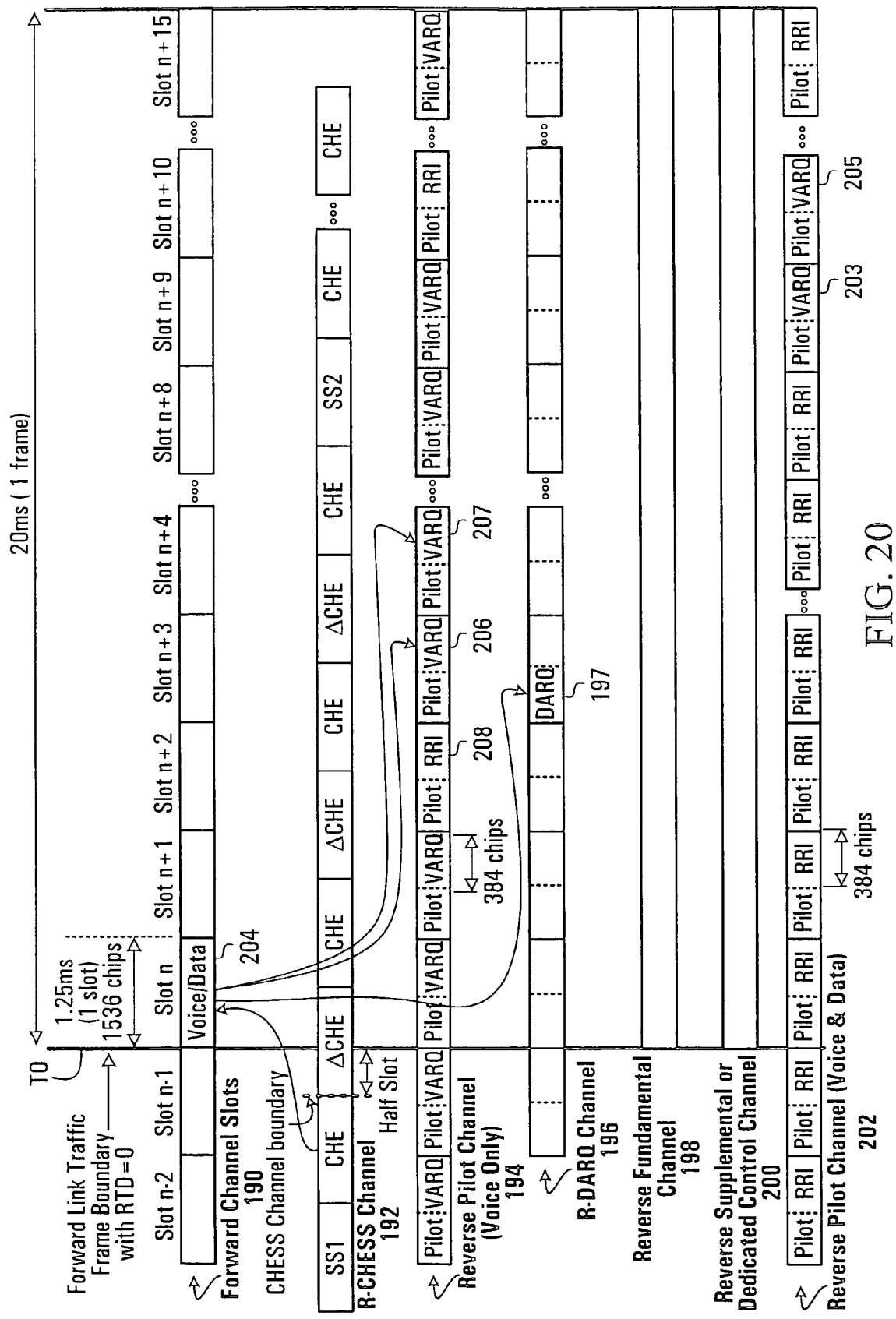
FIG. 20 is a reverse link timing diagram.

Each of the reverse link channels will now be detailed in turn with reference to FIG. 20 which is a reverse link timing diagram showing how the timing of the various reverse link channels relates to that of the forward channels slots as received by a wireless terminal. Forward link traffic is transmitted over 20 ms frames containing 16 1.25 ms forward channel slots 190. T0 is the frame boundary at the wireless terminal with an assumed round trip delay of 0. Of course there would be a non-zero round trip delay which would increase as a function of a wireless terminal's distance from the base station. This would have the effect of delaying all of the reverse link timing with respect to the actual forward link slot timing, but not with respect to the forward link slots as received at a given wireless terminal.

Reverse Pilot Channel, RRI Channel, and VARQ Channel

The reverse link MAC is composed collectively of the fast reverse VARQ channel 274, reverse DARQ channel 276, RRI channel 282 and R-CHESS channel 270 (described in detail below). The structure of the pilot channel is preferably the same as the 1xRTT reverse link pilot channel. The last 384 chips of every 1.25 msec slot contains a single bit of information. For 1xRTT this bit is a power control bit. For this embodiment of the invention this bit is instead used to communicate VARQ and RRI. The pilot channel is used by the BS as a phase reference, for channel estimation and for the reverse link power control.

The reverse pilot channel 194 is the same as the IXRTT reverse pilot channel when operating in backward compatible mode. In backwards compatible mode, the wireless terminal is a legacy wireless terminal. In this embodiment of the invention, rather than providing another dedicated ARQ channel for VARQ for each wireless terminal, the power control bits (PCB) of the pilot signals in the 1xRTT reverse link structure are replaced by a reverse rate indicator (RRI) and ARQ for voice services. When the wireless terminal used the forward shared channel for the forward link, then each pilot channel 194 slot contains pilot, RRI, and VARQ fields as described in detail below. The timing of the reverse pilot channel is shown in FIG. 20 and is slightly different depending on whether voice only indicated generally at 194, or voice and data is being transmitted indicated generally at 202. In both cases, the reverse pilot channel 194,202 is aligned with the forward channel slots, so there are 16 1.25 ms slots.

Figure 19:
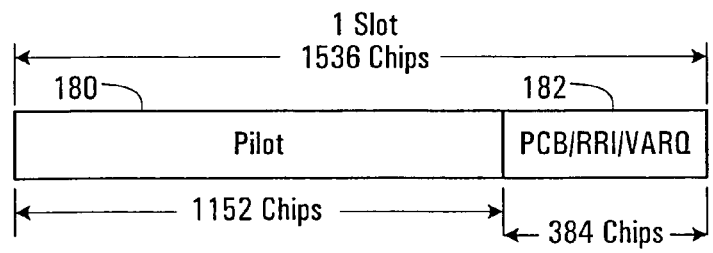
FIG. 19 shows an example structure for the reverse pilot channel.

The reverse link pilot channel is summarized at a very high level in FIG. 19. Again, this is similar to the 1xRTT reverse pilot channel except that the power control bits are now replaced by RRI (reverse rate indicator) and Voice ARQ (VARQ) bits. The pilot channel over one slot contains a pilot period 180 during which 1152 pilot chips are sent, and a period 182 during which the PCB/RRI/VARQ is sent over 384 chips, PCB being sent by legacy terminals. During an entire frame, there are 16 bit positions available through the collective use of period 182 from 16 slots (formerly used for power control) which are now used for RRI/VARQ.

Case 1: Voice Only Users

For the voice only users, the position of the ACK or NAK bit is not fixed. Slots 2, 6, 10 and 14 are reserved for RRI. A single RRI bit is mapped to all 4 bit positions to indicate the use of the fundamental channel and dedicated control channel. Setting all four RRI bits to "0" in one frame indicates that there is only fundamental channel being transmitted. Setting all four bits in one frame to "1" indicates that the DCCH and fundamental channel are being transmitted.

If a user's voice data is decoded correctly, the ACK VARQ signal will be sent to the base station in all the slots in the frame. If nothing was transmitted for the user in a given slot, or if the user's voice data is decoded incorrectly, then a NAK VARQ signal will be sent to the base station. Preferably, a "1" is sent to indicate an ACK, and a "0" is sent to indicate a NAK. The possible positions of the VARQ signals are in slots 3,4, 7,8,9,11,12,13 and 15 of the current frame and slots 0 and 1 of the next frame. For a Forward traffic channel voice frame transmitted in slot n of the forward channel, the corresponding ACK channel bit is transmitted in slots n+2 and any following remaining slots in the frame and slots 0 and 1 of the following frame.

An example of this can be seen in the timing diagram of FIG. 20 where it is assumed a forward voice packet for a voice only user is sent to a given wireless terminal during slot n 204. After slot n and slot n+1 are received, slot n+2 containing an RRI bit 208, the VARQ is included in the RRI/VARQ bit in the reverse pilot channel 194 during the following the remaining non-RRI slots of the frame, including for example slots 206, 207 and during the first two slots of the next frame (not shown).

Case 2: Voice and Data Users

The timing of the VARQ for voice plus data users is shown in FIG. 20 indicated generally at 202. In this case, 14 PC bits in one frame will be used for RRI to indicate the rate being used on the reverse supplemental channel. Preferably, each RRI symbol (3 bits) is mapped to a simplex code with a length of seven, repeated twice, mapped to RRI/VARQ locations 0 to 8 and 11-16. The RRI is used to indicate whether the dedicated control channel or supplemental channel or neither is active for the current frame. The three bit RRI symbol can take one of eight values, one value (preferably 0) indicating that there is no DCCH and no supplemental channel, one value (preferably 1) indicating that the DCCH only is being transmitted, and remaining values 2 through 7 indicating supplemental channel only, and indicating a particular rate for the supplemental channel. The rates are detailed below under the discussion of the supplemental channel with reference to FIGS. 22 and 23.

The VARQ signals are transmitted in fixed positions at the 9th and 10th slots 203,205. If the user's data is correctly decoded, the ACK VARQ signal will be sent. Otherwise, a NAK VARQ signal will be sent to base station.

Data ARQ

For data ARQ, the data ARQ channel 196 is used by data or voice and data users which is also aligned with the forward channel slots, so there are 16 1.25 ms slots. An ACK signal is sent to the base station if the wireless terminal receives a data packet correctly. When the wireless terminal detects the proper UICH and the CRC of the received data packet fails, a NAK signal is sent to the base station. When the wireless terminal does not detect the proper UICH then no ACK or NAK signal will be sent. The DARQ signals for data are sent using the DARQ channel in the first half slot starting two slots after the end of the data packet is received at the wireless terminal. An example of this is shown in FIG. 20 where a data packet has been transmitted on slot n, and the DARQ 197 is sent on the R-DARQ channel 196 in the first half slot of slot n+3.

Figure 18:
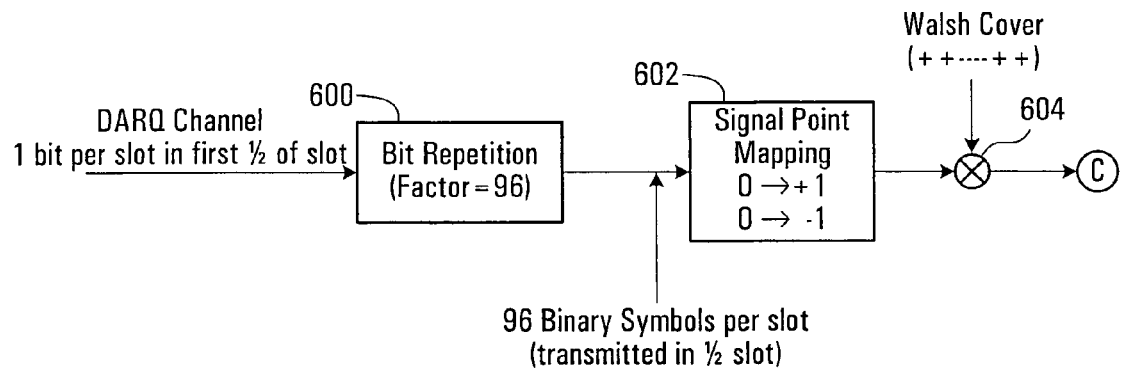
FIG. 18 is a block diagram of an example reverse data ARQ channel structure.

The structure of the reverse DARQ channel is shown in FIG. 18. DARQ takes one bit per slot in first ½ slot, employs bit repetition 600, signal point mapping 602 and Walsh cover 604.

Reverse Link Supplemental Channel and Fundamental Channel

The reverse supplemental channel has a variable data rate from 4.8 kbps to 1228.8 kbps. The fundamental channel is supported for voice, with preferably both 1xRTT 8k and 13k vocoders being supported as well as a new 8k vocoder with turbo coded full rate voice. Simultaneous voice and data can be transmitted. The variable data rates are determined by the wireless terminal in cooperation with the base station through the use of a rate set identifier broadcast by base station on the forward link, and a RRI (reverse rate indicator) sent on the reverse link as discussed in detail above. The rate set identifies either the low rate set or the high rate set. Signaling is transmitted on the dedicated control channel.

FIG. 22 is a table of an example set of reverse traffic channel coding and modulation parameters for a low rate set (one supplemental channel), and FIG. 23 is a table of an example set of reverse traffic channel coding and modulation parameters for a high rate set (two supplemental channels). Parameters are shown for seven different sets of parameters, each set of parameters being distinguished by a different reverse rate indicator. Each set of parameters has a respective data rate, encoder packet size, overall code rate, code symbols/Packet, code symbol rate, interleaved packet repeats, mod. Symbol rate, data modulation, and PN chips per encoder bit. Reverse rate indicator 0 means that there is no dedicated control or supplemental channel content. Reverse rate indicator 1 means that only the dedicated control channel is being used on the reverse link. Rate indicators 2 through 7 relate to supplemental channel content. In the event a user is also transmitting voice, this would be transmitted on the fundamental channel.

R-CHESS Channel

A channel estimate and sector selector reporting scheme for wireless air interface is provided by an embodiment of the invention. In this scheme, by time division multiplexing channel estimate and sector selector information (compared to sending the information simultaneously), the bit rate is reduced significantly and reverse link capacity is improved. A handoff mechanism is also provided which uses the sector selector and channel estimate information.

In the new scheme, channel conditions are reported in an objective manner.

A wireless terminal may report its channel estimate to a base station to help the base station to determine the data transmission rate. A wireless terminal may also monitor all the sectors it can receive, and select the best one and report it. With the channel estimate and sector selector information, base stations can use good channel conditions more efficiently and improve forward link throughput. In the new reporting scheme, in every eight consecutive time slots, wireless terminals report channel estimates in the seven consecutive slots and report sector selector information in one slot.

Figure 17B:
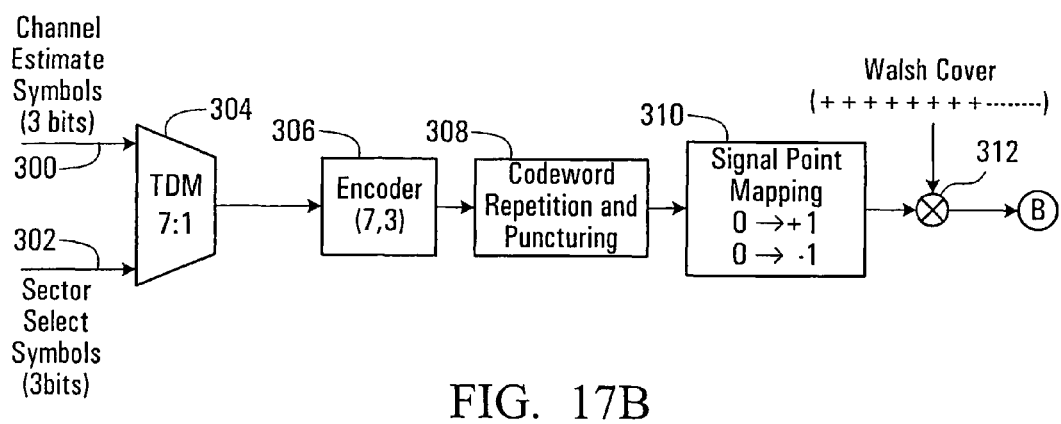
FIG. 17B is a block diagram of an example reverse CHESS channel structure.

The new channel is referred to herein as the R-CHESS channel, standing for Reverse CHannel Estimate and Sector Selector (R-CHESS) channel. The structure of the R-CHESS channel is shown in FIG. 17B. Three bits are used to represent a channel estimate or a change in channel estimate 300, and three bits are used to represent sector selector symbols 302. The channel estimate or change in the channel estimate is mapped to the three bit CHE or Δ-CHE value depending on the coding scheme of the channel estimate. CHE represents the current channel estimate, while Δ-CHE represents the difference between the current channel estimate and the previous channel estimate. These are time division multiplexed 304 such that seven channel estimates 300 (CHE and/or Δ-CHE) are reported for every one sector selection 302. The multiplexed stream is then simplex encoded with encoder 306. The codeword is then repeated 14 times and punctured as indicated by block 308. The result is signal point mapped 310, and then spread by the R-CHESS channel Walsh cover 312.

The CHE (delta CHE), SS values are transmitted at a data rate of 800 values per second. The timing of the CHESS channel relative to other reverse link channels is shown in the timing diagram of FIG. 20. The R-CHESS channel 192 is shown to have 1.25 ms slots which are one half slot offset from the forward channels slots. In this manner, even allowing for round trip delay, a given R-CHESS channel slot is received at the base station in time for the base station to use the CHE information for the next forward channel slot. In the illustrated example, in a 16 slot frame, the SS is transmitted during slots 0 (SS1) and 8 (SS2), CHE is transmitted during slots 1,3,5 7,9,11,13 and 15, and Δ-CHE is transmitted during slots 2,4,6,10,12,14. In another embodiment, a CHE value is sent slots 1 to 7 and 9 to 16 and no Δ-CHE is sent.

A handoff mechanism using the R-CHESS information will now be briefly described. The sector selector indicator is used to indicate the sector that the wireless terminal thinks it should be operating. The three bit field can indicate one of seven sectors and a null value. As a background process, the wireless terminal measures the pilot signal strength of base station sectors, and when the signal strength of a sector of a base station becomes sufficiently strong, this is reported to the access network, and the sector is added to the active set for the wireless terminal. A sector select value is defined for each sector in the active set. Similarly, when a sector's pilot strength goes below a threshold, that sector is removed from the active set.

For reverse traffic, all sectors in the active set listen to transmissions from the wireless terminal, and preferably, for each receive slot, the best of multiple signals received by multiple sectors is selected as the receive signal. This provides a soft reverse link handoff mechanism For forward traffic, only the sector defined by the sector select value transmits subject to the timing constraints below. This can change from slot to slot. Thus, forward link handoff is completely sector select driven.

Preferably, for data or data/voice users, the sector select value is not allowed to change from one sector value directly to another sector value. It can only change from a sector value to the null value then to a sector value.

If the sector select value changes from a sector value (for example, sector A) to the null value, the wireless terminal still reports CHE values for sector A for the some fixed number of slots, for example 7. Then the sector select can change to a different sector value and the wireless terminal starts to report CHE for the new sector. For simultaneous voice and data users, both voice and data are handed off at the same time.

For voice only users, preferably the sector select is allowed to change directly from one sector value to another sector value. Also if sector select changes a sector value, (e.g. A to B) then the wireless terminal continues to report CHE for sector A for the remainder of the frame, the assumption being that voice users get one slot per frame. Then the wireless terminal begins reporting values for B.

Advanced Access Channel

A new advanced access channel described in applicant's co-pending application Ser. No. 09/983,425, published as U.S. Patent Application Publication No. 2002/0067701, filed Oct. 24, 2001, and hereby incorporated by reference in its entirety improves reverse link capacity.

Figure 21A:
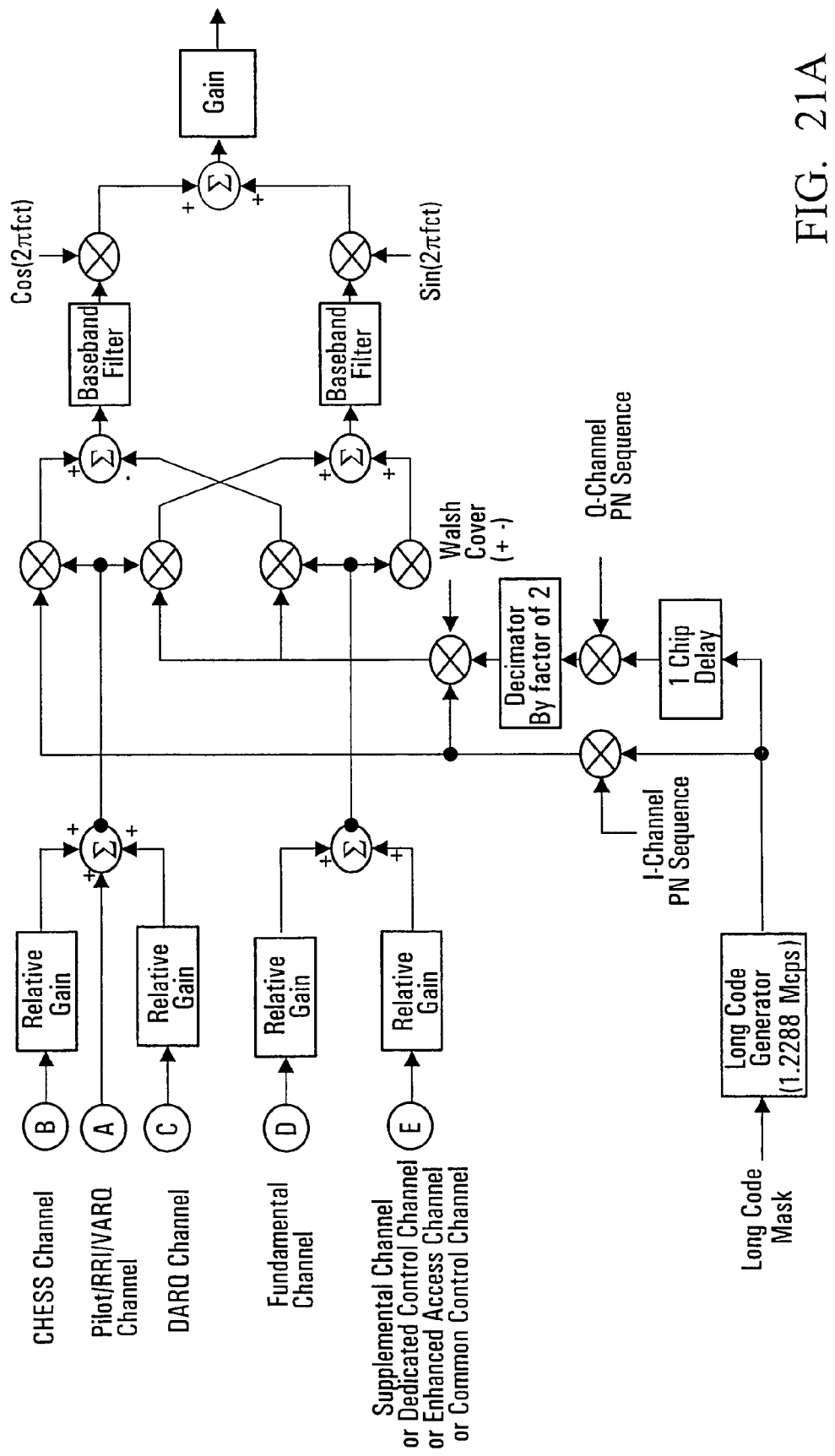
FIG. 21A is a block diagram showing reverse channel I and Q mapping.

An example reverse channel I and Q mapping is shown in FIG. 21A. Inputs to this are the R-CHESS channel input B, the pilot/RRI/VARQ channel input B, DARQ channel input C, fundamental channel input D, and supplemental channel or dedicated control channel or enhanced access channel or common control channel input E.

Figure 21B:
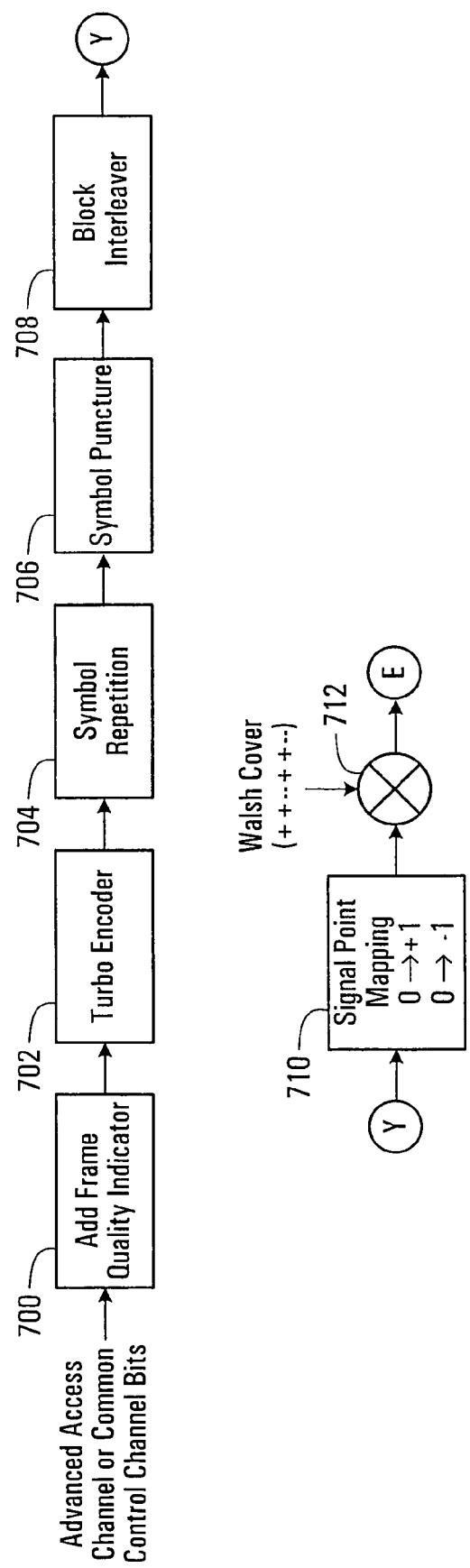
FIG. 21B is a block diagram of the reverse advanced access/common control channel.

The structure of the advanced access channel shown in FIG. 21B. The advanced access channel or common control channel bits are added to a frame quality indicator 700, turbo encoded 702, symbol repeated in symbol repetition 704, punctured with symbol puncture 706, and then block interleaved with block interleaver 708. Signal point mapping is performed 710 and then the appropriate Walsh cover applied 712.

Figure 21C:
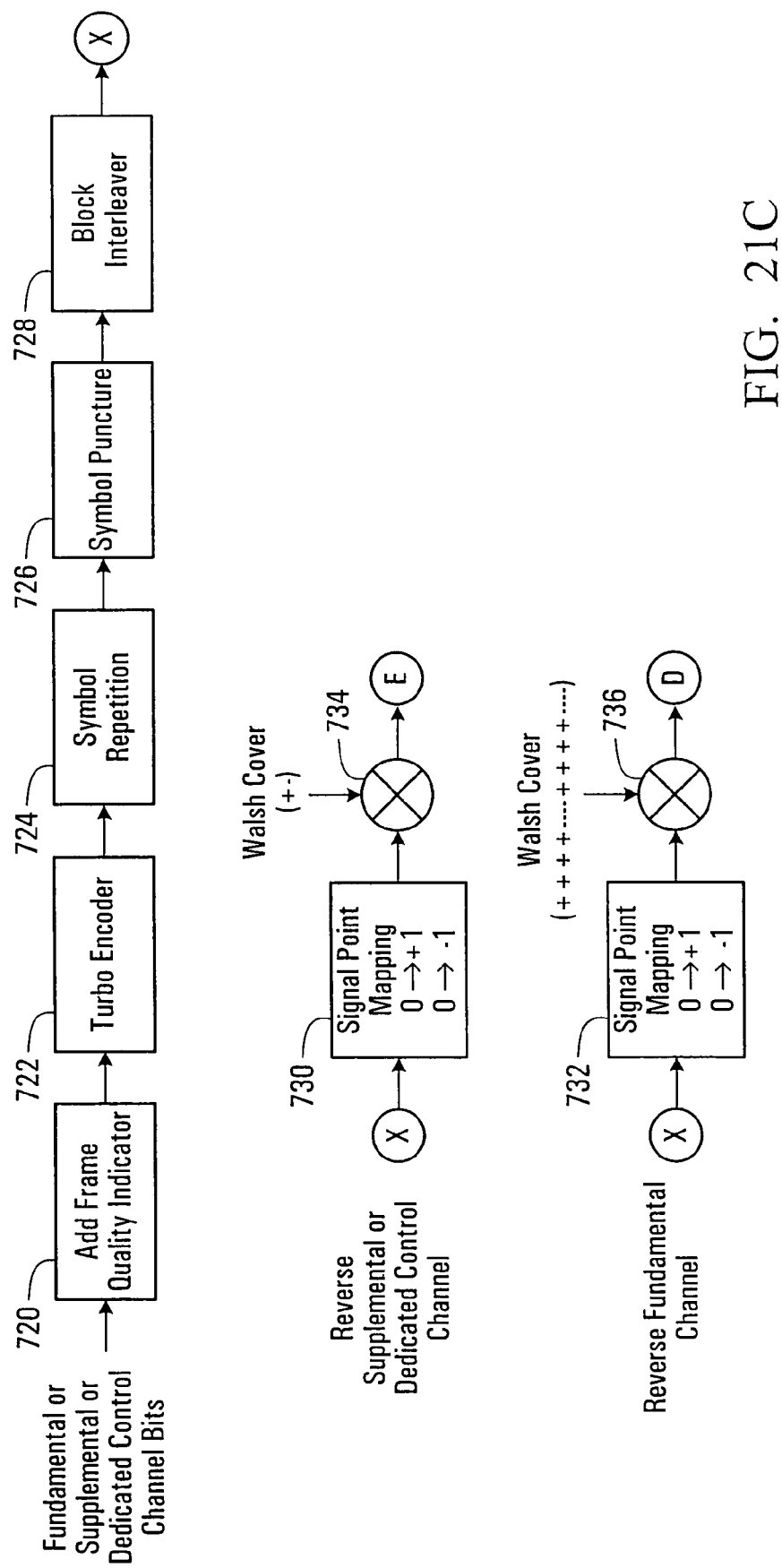
FIG. 21C is a block diagram of the reverse traffic/dedicated control channels.

A similar structure is employed for the fundamental channel, supplemental channel or dedicated control channel bits as indicated at FIG. 21C. The channel bits are added to a frame quality indicator 720, turbo encoded 722, symbol repeated in symbol repetition 724, punctured with symbol puncture 726, and then block interleaved with block interleaver 728. Signal point mapping is performed 730,732 and then the appropriate Walsh cover applied 734,736 with a different Walsh cover being applied to the reverse supplemental or dedicated control channel than to the reverse fundamental channel.

Numerous modifications and variations of the present invention are possible in light of the above teachings. It is therefore to be understood that within the scope of the appended claims, the invention may be practiced otherwise than as specifically described herein.

We claim:

1. A wireless terminal adapted to function in a CDMA communications system, the terminal comprising:
   a receiver adapted to receive frames having a slot structure in which there is a user identification channel and a shared channel, each slot of the shared channel having been transmitted using a plurality of Walsh codes and containing content for either a plurality of voice users, a plurality of voice users and one high-rate data user, or only one high-rate data user, wherein a slot of the shared channel contains content for a plurality of users which was transmitted in parallel using different Walsh code spaces for different users, wherein the user identification channel is received in parallel with the shared channel using different Walsh code spaces;
   the wireless terminal being adapted to decode the user identification channel to determine if a current slot of the shared channel contains voice and/or high-rate data content for the wireless terminal.

2. The wireless terminal according to claim 1 wherein in the event the wireless terminal determines the current slot contains voice content for the wireless terminal, the receiver is adapted to blindly distinguish between a plurality of different coding and modulation types which may have been used to transmit the voice content based on getting a correct CRC.

3. The wireless terminal according to claim 1 adapted to decode the user identification channel using an assigned user identifier Walsh and sub-identifier.

4. The wireless terminal according to claim 1 adapted to be assigned at least one group ID as a voice user and adapted to be assigned a group ID as a data user;
   wherein a single group ID is transmitted on a preamble of each slot, so as to inform the wireless terminal whether the slot has content for the user.

5. The wireless terminal according to claim 4 wherein each voice user has three Group IDs, one GID1 for use when its voice is transmitted using one 16-ary Walsh cover, one GID2 for use when its voice is transmitted using two 16-ary Walsh covers, and one GID4 for use when its voice is transmitted using four 16-ary Walsh covers;
   wherein the each voice user has Walsh covers assigned to it for each of the its three Group IDs such that when a given group ID is transmitted, all voice users having been assigned the given group ID will know the slot contains their content, will know how many Walsh codes recover and which Walsh codes to recover.

6. The wireless terminal according to claim 1 further adapted to perform fast ARQ for voice.

7. The wireless terminal according to claim 1 adapted to perform fast ARQ for voice by:
   determining a correlation result based on the correlation between the user identification channel and an assigned user identifier;
   if the correlation result is greater than a first threshold and less than a second threshold, the wireless terminal decoding further channels, and if these channels pass an integrity check, sending an ACK to the base station, and otherwise, the wireless terminal discarding the current packet;
   if the correlation result is greater than the second threshold, the wireless terminal decoding further channels, and if these channels pass an integrity check, sending a ACK signal to the base station, and if these channels do not pass the integrity check sending an NAK to the base station.

8. The wireless terminal according to claim 7 further adapted to save current packet raw data samples for soft combining or incremental redundancy with a future received data packet.

9. The wireless terminal according to claim 1 further adapted to look for a single user identifier if the wireless terminal is expecting voice only, and if the wireless terminal is expecting voice and data, to look for two user identifiers, one for voice and one for data.

10. The wireless terminal according to claim 9 further comprising:
    in the event the current slot contains data for the wireless terminal as determined by the user identification channel, decoding another forward link channel to determine parameters used in transmitting the data, and then using a data rate determined from the other forward link channel to demodulate the data on the shared channel.

11. The wireless terminal according to claim 1 further adapted to perform voice ARQ.

12. The wireless terminal according to claim 11 adapted to perform the voice ARQ using a modified 1xRTT pilot channel.

13. The wireless terminal according to claim 12 wherein the modified 1xRTT pilot channel is further used to transmit a reverse rate indicator.

14. The wireless terminal according to claim 13 adapted to perform the voice ARQ by transmitting VARQ bits subject to:
    when functioning with a voice service only, positions of the VARQ bits are in slots 3,4,7,8,9,11,12,13 and 15 of a current frame and slots 0 and 1 of a next frame, with slots 2, 6, 10 and 14 being reserved for the reverse rate indicator;
    when functioning with both data and voice services, positions for the VARQ bits are fixed within a frame at slots 9 and 10, with remaining slots used for the reverse rate indicator.

15. The wireless terminal according to claim 11 adapted to:
    when functioning as a wireless terminal of a mixed data and voice user, map each reverse rate indicator symbol of a reverse rate indicator to a simplex code with length of 7 repeated twice and mapped to slots 0-8 and 11-15, with the voice ARQ being one bit mapped into slot 9 and 10, the reverse rate indicator being used to indicate whether a Reverse Dedicated Control Channel or a Reverse Supplemental Channel or neither is active for a current frame;
    when functioning as a wireless terminal of a voice only user, map a RRI bit to slots 2, 6, 10 and 12, with the voice ARQ being one bit mapped into any two consecutive slots that are not reserved for the reverse rate indicator.

16. The wireless terminal according to claim 11 further adapted to transmit a Reverse Channel Estimate and Sector Selector (R-CHESS) channel having a slot for each forward slot, with some slots containing channel estimates and other slots containing sector select values.

17. The wireless terminal according to claim 16 wherein the R-CHESS channel is adapted to allow sector selection for data users which precludes the changing from a sector value directly to another sector value, only allowing a change from a sector value to a null value and then to another sector value.

18. The wireless terminal according to claim 17 wherein if a sector select value changes from a first sector value to a null value, the wireless terminal is adapted to continue to report channel estimates for the first sector value for a number of subsequent slots;

when the sector select value changes to a different sector value, the wireless terminal starts to report channel estimates for the different sector value.

19. The wireless terminal according to claim 16 wherein each channel estimate comprises a three bit value representative of an absolute channel estimate.

20. The wireless terminal according to claim 16 wherein the channel estimates comprise three bit values alternating between being representative of an absolute channel estimate and a change in channel estimate.

21. The wireless terminal according to claim 16 wherein:
the sector select values are sent during a first and ninth of sixteen available R-CHESS channel slots, and channel estimates are sent during the remaining of the slots.

22. The wireless terminal according to claim 1 adapted to process packets sent on the shared channel providing systematic predetermined incremental redundancy symbol selection for voice and data in which an even second timing referenced to Universal Coordinated Time has been used to select a portion of turbo coded data symbols to be sent in a given slot, a count value k is used which starts on each even second which counts from k=0 to Kmax incrementing every (even second interval)/K;

starting (i1) and ending (i2) symbol positions are calculated of a actual Turbo transmitted packet are from i1=1+mod(kL,M), i2=i1+L−1, a Turbo coded packet being viewed as a periodic signal with period M, where N is a user payload packet size in number of symbols, M is a coded packet size, which is a packed size in number of symbols after Turbo coding, and L is an actual Turbo transmitted packet size in number of symbols resulting in an effective coding rate would be N/L, the wireless terminal being adapted to process the packets by:

deriving packet size information, and using the count value, determining which portion of the turbo coded packet the received packet belongs to.

23. The wireless terminal according to claim 22 further adapted to decode a packet and perform a quality check on a decoded packet;

if the decoded packet does not pass the quality check, check if a previous received packet was decoded correctly or not;

if the previous received packet is wrong, the packet will be used for soft combining and/or incremental redundancy with the previous received packet;

if the previous received packet is correct or a joint decoded packet is wrong, a NAK signal is sent to a base station, and the packet will be stored and may be used for soft combining and/or incremental redundancy with a future received packet.

24. The wireless terminal according to claim 1 adapted to transmit supplementary channel(s) according to parameters in any row of the tables in FIG. 22 and FIG. 23.

25. A wireless terminal for a CDMA communications system, comprising:
a receiver adapted to receive frames having a slot structure in which there is a user identification channel and a shared channel, the shared channel having been transmitted using a plurality of Walsh codes, and containing in some slots content for a single high-rate data user and content for a voice user, the user identification channel being transmitted in parallel with the shared channel using a different code space, the wireless terminal being adapted to decode the user identification channel to determine if a current slot of the shared channel contains voice and/or high-rate data content for the wireless terminal.

26. A wireless terminal adapted to function in a CDMA communications system, the terminal comprising:
a receiver adapted to receive frames having a slot structure in which there is a user identification channel and a shared channel, the shared channel and the user identification channel having been transmitted in parallel using different Walsh code spaces, each slot of the shared channel containing content for either a plurality of voice users, a plurality of voice users and one high-rate data user, or only one high-rate data user;
the wireless terminal being adapted to decode the user identification channel to determine if a current slot of the shared channel contains voice and/or high-rate data content for the wireless terminal.

* * * * *